(12) United States Patent
Matsuo et al.

(10) Patent No.: US 11,385,342 B2
(45) Date of Patent: Jul. 12, 2022

(54) OBJECT SENSING APPARATUS, OBJECT SENSING METHOD, AND COMPUTER READABLE RECORDING MEDIUM

(71) Applicant: NEC Corporation, Tokyo (JP)

(72) Inventors: Daisuke Matsuo, Tokyo (JP); Shingo Yamanouchi, Tokyo (JP); Masayuki Ariyoshi, Tokyo (JP)

(73) Assignee: NEC CORPORATION, Tokyo (JP)

(*) Notice: Subject to any disclaimer, the term of this patent is extended or adjusted under 35 U.S.C. 154(b) by 333 days.

(21) Appl. No.: 16/483,469

(22) PCT Filed: Feb. 6, 2017

(86) PCT No.: PCT/JP2017/004282
§ 371 (c)(1),
(2) Date: Aug. 5, 2019

(87) PCT Pub. No.: WO2018/142628
PCT Pub. Date: Aug. 9, 2018

(65) Prior Publication Data
US 2020/0011984 A1    Jan. 9, 2020

(51) Int. Cl.
*G01S 13/34*    (2006.01)
*B66B 1/34*    (2006.01)
(Continued)

(52) U.S. Cl.
CPC ............ *G01S 13/34* (2013.01); *B66B 1/3492* (2013.01); *G01S 13/536* (2013.01); *G01S 13/60* (2013.01); *H04L 27/2628* (2013.01)

(58) Field of Classification Search
CPC ...... G01S 13/34; G01S 13/343; G01S 13/931; G01S 13/356; G01S 13/60; G01S 13/93271
(Continued)

(56) References Cited

U.S. PATENT DOCUMENTS 7,049,945 B2 * 5/2006 Breed .................... G01S 7/481
340/435
7,345,618 B1 * 3/2008 Cole ..................... G01S 13/32
342/22
(Continued)

FOREIGN PATENT DOCUMENTS

JP    10-239426 A    9/1998
JP    2013-72865 A   4/2013
(Continued)

OTHER PUBLICATIONS

Daisuke Matsuo, Simultaneous Multi-Object Micro-Displacement Measurement by Multi-Spectral-Peak Radar Interferometry, IEEE or WiSNet. (Year: 2018).*

(Continued)

*Primary Examiner* — Erin F Heard
*Assistant Examiner* — Michael W Justice

(57) ABSTRACT

An object sensing apparatus 1 includes: an emission unit 11 configured to emit an RF transmission signal in each period; a reception unit 21 configured to receive a reflected wave of the RF transmission signal as an RF reception signal; an IF signal generation unit 22 configured to generate an IF signal by mixing the RF transmission signal and the RF reception signal; a one-dimensional spectrum generation unit 23 configured to generate a one-dimensional spectrum with respect to distance obtained using the object sensing apparatus as a reference, based on the IF signal, and use the generated one-dimensional spectrum to generate a one-dimensional spectrum with fixed object reflection removed, from which a signal component caused by a reflected wave from a fixed object present in an emission range has been removed; a position detection unit 24 configured to detect a position of (Continued)

an object other than the fixed object based on the amplitude of the one-dimensional spectrum with fixed object reflection removed; and a displacement detection unit 25 configured to detect displacement of the object other than the fixed object, based on the phase of the one-dimensional spectrum with fixed object reflection removed, which corresponds to the position of the object other than the fixed object.

15 Claims, 13 Drawing Sheets

(51) Int. Cl.
*G01S 13/536* (2006.01)
*G01S 13/60* (2006.01)
*H04L 27/26* (2006.01)

(58) Field of Classification Search
USPC .......................... 342/128, 196, 118, 110, 70
See application file for complete search history.

(56) References Cited

U.S. PATENT DOCUMENTS

| | | | | |
|---|---|---|---|---|
| 8,779,965 | B2* | 7/2014 | Sentelle | G01S 13/56 |
| | | | | 342/22 |
| 9,229,102 | B1* | 1/2016 | Wright | G01S 13/887 |
| 9,316,727 | B2* | 4/2016 | Sentelle | G01S 13/42 |
| 10,436,888 | B2* | 10/2019 | Li | G01S 7/415 |
| 2011/0148686 | A1* | 6/2011 | Cole | G01S 13/32 |
| | | | | 342/22 |
| 2013/0113647 | A1* | 5/2013 | Sentelle | G01S 13/887 |
| | | | | 342/22 |
| 2013/0300573 | A1* | 11/2013 | Brown | G01S 7/40 |
| | | | | 340/870.01 |
| 2015/0301167 | A1* | 10/2015 | Sentelle | G01S 13/888 |
| | | | | 342/22 |
| 2015/0309166 | A1* | 10/2015 | Sentelle | G01S 13/887 |
| | | | | 342/22 |

FOREIGN PATENT DOCUMENTS

| | | |
|---|---|---|
| JP | 2014-126523 A | 7/2014 |
| JP | 2016-156751 A | 9/2016 |
| WO | 2015/184406 A1 | 12/2015 |
| WO | 2016/136371 A1 | 9/2016 |

OTHER PUBLICATIONS

International Search Report in International Application No. PCT/JP2017/004282, dated Apr. 25, 2017.
Written Opinion in International Application No. PCT/JP2017/004282, dated Apr. 25, 2017.
Mac Fujimoto, et al., "76/79 GHz Millimeter Wave Radar System Solution for Realizing Advanced Driving Assistance System (ADAS) FTF-AUT-F0736", Freescale Technology Forum 2014, Dec. 4, 2014, pp. 1-28 (29 pages total).
Kazuhiro Yamaguchi, et al., "A 24 GHz band FM-CW radar system for detecting closed multiple targets with small displacement," The Seventh International Conference on Ubiquitous and Future Networks (ICUFN 2015), Jul. 2015, pp. 268-273 (6 pages total).
Shingo Yamanouchi, et al., "Multiple-object Recognition Radar Based on Multiple-peak Interferometry", Proceedings of the 2016 IEICE Communications Society Conference Koen Ronbunshu 1, Sep. 6, 2016, p. 411 (1 page total).
Yamanouchi, Shingo et al., "Multiple-object Recognition Radar Based on Multiple-peak Interferometry", Proceedings of the 2016 IEICE Communications Society Conference Koen Ronbunshu 1, Sep. 6, 2016, p. 411.

* cited by examiner $X_r(\omega,k)=X_{rtgt}(\omega,k)+X_{rsta}(\omega)$

OBJECT SENSING APPARATUS, OBJECT SENSING METHOD, AND COMPUTER READABLE RECORDING MEDIUM

This application is a National Stage Entry of PCT/JP2017/004282 filed on Feb. 6, 2017, the contents of all of which are incorporated herein by reference, in their entirety.

TECHNICAL FIELD

The present invention relates to an object sensing apparatus and an object sensing method for sensing an object using electromagnetic waves, and further relates to a computer readable recording medium that includes a program recorded thereon, for realizing the object sensing apparatus and the object sensing method.

BACKGROUND ART

Conventionally, a sensing method using radar technology has been known as a method for sensing an object in a state in which it is difficult to sense an object using eyesight or a camera, such as during night-time, during bad weather, in an environment in which there is a wall blocking the field of view, or the like.

For example, Non-Patent Document 1 discloses a technique for sensing an object using radar of an FMCW or Fast-FMCW scheme. Also, Non-Patent Document 2 discloses a technique for sensing multiple target objects using radar of an FMCW (Frequency Modulated Continuous Wave) scheme. Also, according to the technique disclosed in Non-Patent Document 2, it is also possible to measure minute displacement of the sensed target objects by using the change in phase of the received signal.

LIST OF PRIOR ART DOCUMENTS

Non-patent Document

Non-Patent Document 1: Mac Fujimoto, Yusuke Takemoto, "76/79 GHz Millimeter Wave Radar System Solution for Realizing Advanced Driving Assistance System (ADAS) FTF-AUT-F0736", [online], FREESCALE TECHNOLOGY FORUM 2014, [searched for on Apr. 26, 2016], Internet <URL: http://www.nxp.com/ja/files/FTF-AUT-F0736.pdf?fsrch=1&sr=2&pageNum=1>

Non-Patent Document 2: K. Yamaguchi, M. Saito, T. Akiyama, T. Kobayashi and H. Matsue, "A 24 GHz band FM-CW radar system for detecting closed multiple targets with small displacement," The Seventh International Conference on Ubiquitous and Future Networks (ICUFN 2015), pp. 268-273, July 2015

SUMMARY OF INVENTION

Problems to be Solved by the Invention

In view of this, if an object is sensed using the technique disclosed in Non-Patent Document 1, the distance resolution is generally about 0.3 meters (see pages 13 to 15 in Non-Patent Document 2). This is because the width of the distance that can be detected with these schemes is defined by discrete values each separated by "c/(2BW)" due to the property of the Fourier transform used in the FMCW scheme or the Fast-FMCW scheme (c: speed of light, BW: bandwidth of RF signal). That is, if the bandwidth BW is 500 MHz, the distance resolution is 0.3 meters.

For this reason, for example, if a person performs a small action such as moving slightly or waving a hand, the distance resolution is coarse compared to the size of the movement of the object, and therefore with the technique disclosed in Non-Patent Document 1, it is difficult to sense the movement of an object.

On the other hand, with object sensing using the technique disclosed in Non-Patent Document 2, a movement smaller than the distance resolution can be sensed by observing a phase change in a reflected wave. However, with the technique disclosed in Non-Patent Document 2, if a moving body such as a person and a fixed object such as a wall are near each other at a distance within the distance resolution, a case will occur in which it is not possible to distinguish between the moving body and the fixed object and the movement of the moving body cannot be correctly sensed.

An example of an object of the present invention is to provide an object sensing apparatus, an object sensing method, and a program that solves the above-described problems and can accurately sense a moving body in object sensing using radar.

Means for Solving the Problems

In order to achieve the above-described object, an object sensing apparatus according to an example aspect of the present invention includes:

an emission unit configured to emit an RF transmission signal subjected to periodic frequency sweeping, in each period;

a reception unit configured to receive a reflected wave of the RF transmission signal reflected by an object as an RF reception signal;

an IF signal generation unit configured to generate an IF signal in each of the periods by mixing the RF transmission signal and the RF reception signal;

a one-dimensional spectrum generation unit configured to generate a one-dimensional spectrum with respect to distance obtained using the object sensing apparatus as a reference, based on the IF signal of each period, and use the generated one-dimensional spectrum to generate a one-dimensional spectrum with fixed object reflection removed, from which a signal component that is included in the IF signal and is caused by a reflected wave from a fixed object present in an emission range has been removed;

a position detection unit configured to detect a position of an object other than the fixed object based on the amplitude of the one-dimensional spectrum with fixed object reflection removed; and a displacement detection unit configured to detect displacement of the object other than the fixed object, based on the phase of the one-dimensional spectrum with fixed object reflection removed, which corresponds to the detected position of the object other than the fixed object.

Also, in order to achieve the above-described object, an object sensing method according to an example aspect of the present invention includes:

(a) a step of emitting an RF transmission signal subjected to periodic frequency sweeping, in each period;

(b) a step of receiving a reflected wave of the RF transmission signal reflected by an object as an RF reception signal;

(c) a step of generating an IF signal in each of the periods by mixing the RF transmission signal and the RF reception signal;

(d) a step of generating a one-dimensional spectrum with respect to distance obtained using the emitting position of the RF transmission signal or the receiving position of the RF reception signal as a reference, based on the IF signal of each period, and using the generated one-dimensional spectrum to generate a one-dimensional spectrum with fixed object reflection removed, from which a signal component that is included in the IF signal and is caused by a reflected wave from a fixed object present in an emission range has been removed;

(e) a step of detecting a position of an object other than the fixed object based on the amplitude of the one-dimensional spectrum with fixed object reflection removed; and (f) a step of detecting displacement of the object other than the fixed object, based on the phase of the one-dimensional spectrum with fixed object reflection removed, which corresponds to the detected position of the object other than the fixed object.

Furthermore, in order to achieve the above-described object, a computer readable recording medium according to an example aspect of the present invention, in an object sensing apparatus including: an emission unit for emitting an RF transmission signal subjected to periodic frequency sweeping, in each period; a reception unit configured to receive a reflected wave of the RF transmission signal reflected by an object as an RF reception signal; an IF signal generation unit for generating an IF signal in each of the periods by mixing the RF transmission signal and the RF reception signal; and a processor, includes a program recorded thereon, the program including instructions that cause the processor to carry out:

(a) a step of generating a one-dimensional spectrum with respect to distance obtained using the object sensing apparatus as a reference, based on the IF signal of each period, and using the generated one-dimensional spectrum to generate a one-dimensional spectrum with fixed object reflection removed, from which a signal component that is included in the IF signal and is caused by a reflected wave from a fixed object present in an emission range has been removed;

(b) a step of detecting a position of an object other than the fixed object based on the amplitude of the one-dimensional spectrum with fixed object reflection removed; and (c) a step of detecting displacement of the object other than the fixed object, based on the phase of the one-dimensional spectrum with fixed object reflection removed, which corresponds to the detected position of the object other than the fixed object.

Advantageous Effects of the Invention

According to the present invention as described above, a moving body can be accurately sensed in object sensing using radar.

EXAMPLE EMBODIMENT

First Example Embodiment

Hereinafter, an object sensing apparatus, an object sensing method, and a program according to a first example embodiment of the present invention will be described with reference to FIGS. 1 to 6.

Apparatus Configuration

Figure 1:
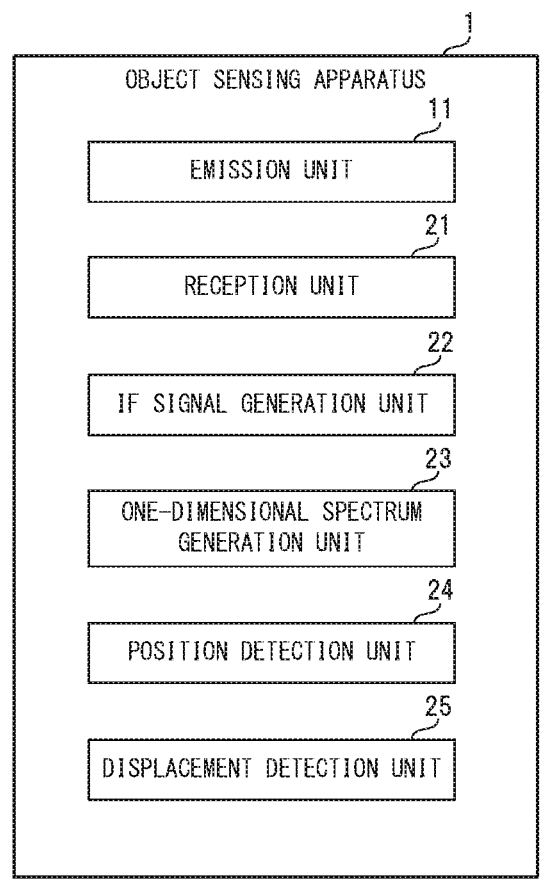
FIG. 1 is a block diagram showing an overall configuration of an object sensing apparatus according to a first example embodiment of the present invention.

First, an overall configuration of an object sensing apparatus according to the first example embodiment will be described. FIG. 1 is a block diagram showing an overall configuration of the object sensing apparatus according to the first example embodiment of the present invention.

As shown in FIG. 1, an object sensing apparatus 1 according to the first example embodiment includes: an emission unit 11; a reception unit 21; an IF signal generation unit 22; a one-dimensional spectrum generation unit 23; a position detection unit 24; and a displacement detection unit 25.

Among these, each period, the emission unit 11 emits an RF (Radio Frequency) transmission signal subjected to periodic frequency sweeping. The reception unit 21 receives the reflected wave of the RF transmission signal reflected by the object as an RF reception signal. Each period, the IF signal generation unit 22 mixes the RF transmission signal and the RF reception signal to generate an IF (Intermediate Frequency) signal.

First, based on the IF signals of each period, the one-dimensional spectrum generation unit 23 generates a one-dimensional spectrum for the distance obtained using the object sensing apparatus 1 as a reference. Next, the one-dimensional spectrum generation unit 23 uses the generated one-dimensional spectrum to generate a one-dimensional spectrum with fixed object reflection removed, from which a signal component that is included in each IF signal and is caused by a reflection wave from a fixed object present in the emission range has been removed.

The position detection unit 24 detects the position of an object other than the fixed object based on the amplitude of the one-dimensional spectrum with fixed object reflection removed. The displacement detection unit 25 detects displacement of the object other than the fixed object based on the phase of the one-dimensional spectrum with fixed object reflection removed, which corresponds to the detected position of the object other than the fixed object.

In this manner, in the first example embodiment, the object sensing apparatus 1 can generate the one-dimensional spectrum with fixed object reflection removed, which is obtained by removing the signal component caused by the reflection wave from the fixed object from the one-dimensional spectrum generated based on the IF signal. Then, the position and displacement of the object other than the fixed object are detected based on the one-dimensional spectrum with fixed object reflection removed. For this reason, according to the first example embodiment, an object (moving body) other than the fixed object can be accurately sensed in object sensing using radar.

Figure 2:
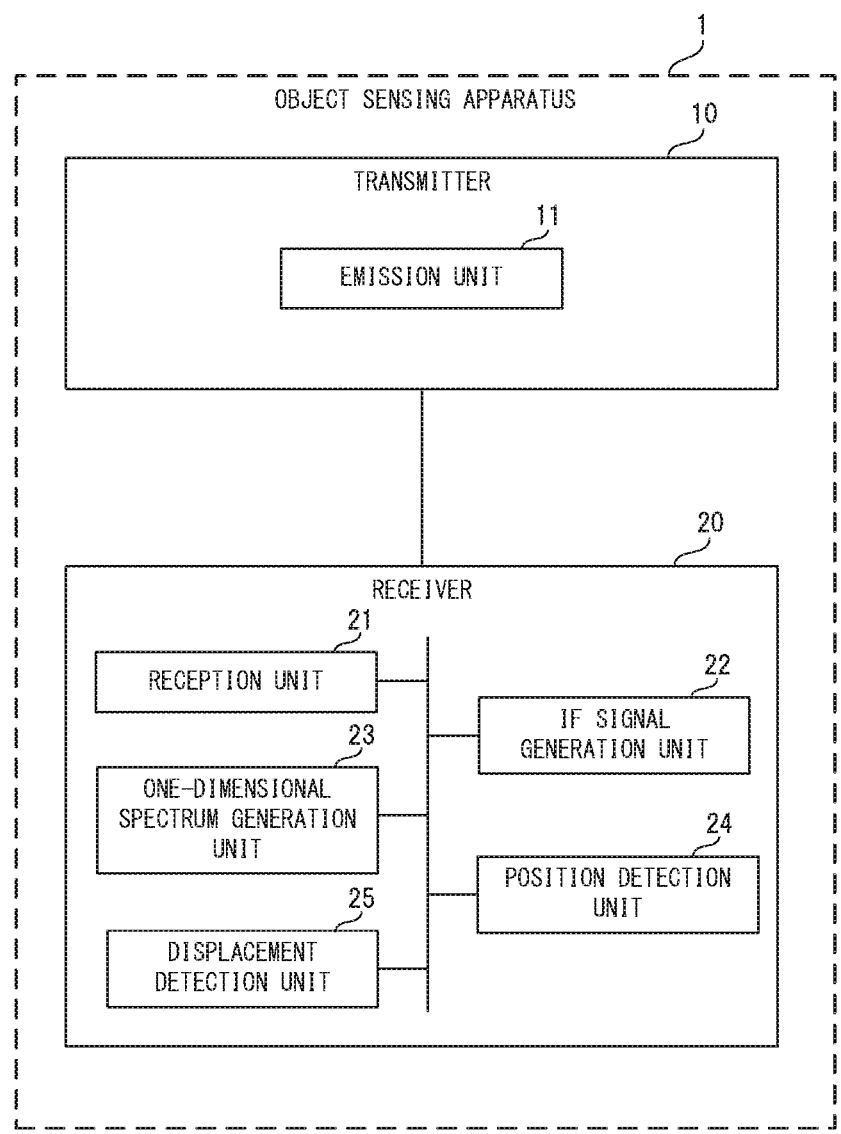
FIG. 2 is a block diagram specifically showing a configuration of the object sensing apparatus according to the first example embodiment of the present invention.

Next, the configuration of the object sensing apparatus 1 according to the first example embodiment will be described in further detail with reference to FIGS. 2 to 5. FIG. 2 is a block diagram specifically showing a configuration of an object sensing apparatus according to the first example embodiment of the present invention.

As shown in FIG. 2, in the first example embodiment, the object sensing apparatus 1 includes a transmitter 10 and a receiver 20, both of which are connected by wire or wirelessly. Also, the transmitter 10 includes the above-described emission portion 11. The receiver 20 includes the above-described reception unit 21, IF signal generation unit 22, one-dimensional spectrum generation unit 23, position detection unit 24, and displacement detection unit 25.

Also, in the first example embodiment, in the object sensing apparatus 1, the emission unit 11, the reception unit 21, and the IF signal generation unit 22 are realized by hardware, and the one-dimensional spectrum generation unit 23, the position detection unit 24, and the displacement detection unit 25 are realized by software. That is, the one-dimensional spectrum generation unit 23, the position detection unit 24, and the displacement detection unit 25 are constructed by executing a program according to the first example embodiment using a computer.

In the transmitter 10, as described above, each period, the emission unit 11 emits the RF (Radio Frequency) transmission signal subjected to periodic frequency sweeping. Also, when the emission unit 11 emits the RF transmission signal, at that timing, the RF transmission signal is input to the receiver 20.

Here, letting u(t) be an RF transmission signal, the RF transmission signal u(t) is expressed by the following equation 1. Note that in the following equation 1, t indicates the time, and U indicates the amplitude of the RF transmission signal u(t). Also, in the following equation 1, θ indicates the phase, which is represented as a function of the time t.

$$u(t) = U \cos[\theta(t)] \quad \text{Equation 1}$$

Figure 3:
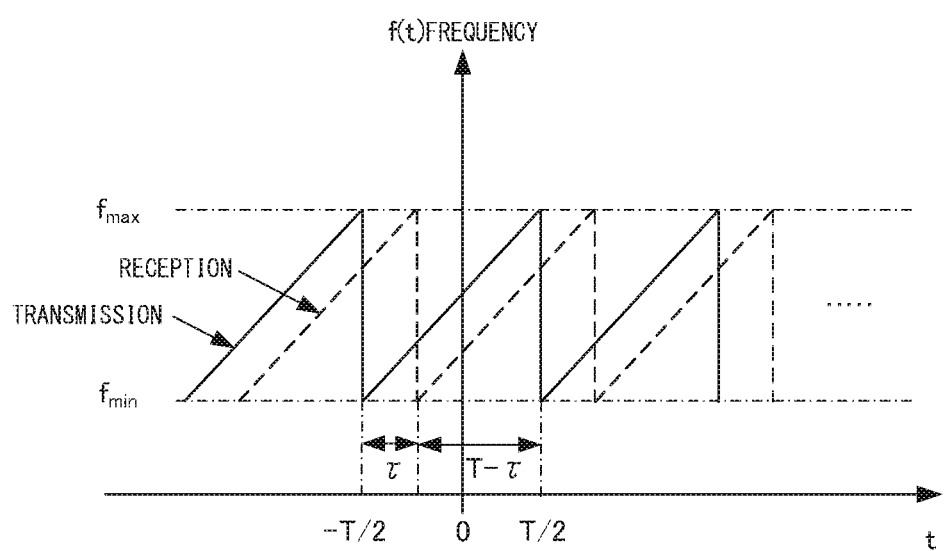
FIG. 3 is a diagram showing an example of an RF transmission signal emitted in the first example embodiment of the present invention.

Also, in the first example embodiment, the RF transmission signal emitted by the emission unit 11 is a chirp signal shown in FIG. 3. FIG. 3 is a diagram showing an example of an RF transmission signal emitted in the first example embodiment of the present invention. Note that the RF reception signal is also shown in FIG. 3.

As shown in FIG. 3, the frequency of the RF transmission signal rises from the minimum value to the maximum value each period. In this case, f(t) can be indicated by the following equation 2, where f(t) is the frequency of the RF transmission signal, which is a chirp signal.

$$f(t) = f_{min} + \alpha(t - kT) \quad \text{Equation 2}$$

In the above-described equation 2, the time t takes a value in the range $(kT - T/2) < t < (kT + T/2)$. k indicates an integer such as 0, ±1, ±2, . . . . T indicates one period of the chirp signal. $f_{min}$ indicates the minimum frequency of the chirp signal. α indicates the change rate per unit time (slope) of the frequency f(t).

Also, if the frequency f(t) of the RF transmission signal u(t) changes as indicated by equation 2 above, the relationship shown in the following equation 3 is satisfied between the frequency f(t) and the phase θ(t).

$$f(t) = (1/2\pi) \times (d\theta(t)/dt) \quad \text{Equation 3}$$

Then, the phase θ(t) is calculated using the following equation 4, based on the above-described equations 2 and 3. Note that in the following equation 4, due to the fact that $t_k = t - kT$ is satisfied, "t−kT" is replaced with $t_k$.

$$\theta(t_k) = 2\pi f_{min} t_k + \pi \alpha t_k^2 \quad \text{Equation 4}$$

In the receiver 20, the reception unit 21 receives the RF reception signal $u_0(t)$ shown in the following equation 4. Also, the reception unit 21 inputs the received RF reception signal $u_0(t)$ to the IF signal generation unit 22. In the following equation 5, $U_0$ indicates the amplitude of the RF reception signal $u_0(t)$. Also, $\theta_0(t)$ indicates the phase, which is indicated as a function of the time t.

$$u_0(t) = U_0 \cos[\theta_0(t)] \quad \text{Equation 5}$$

Figure 7:
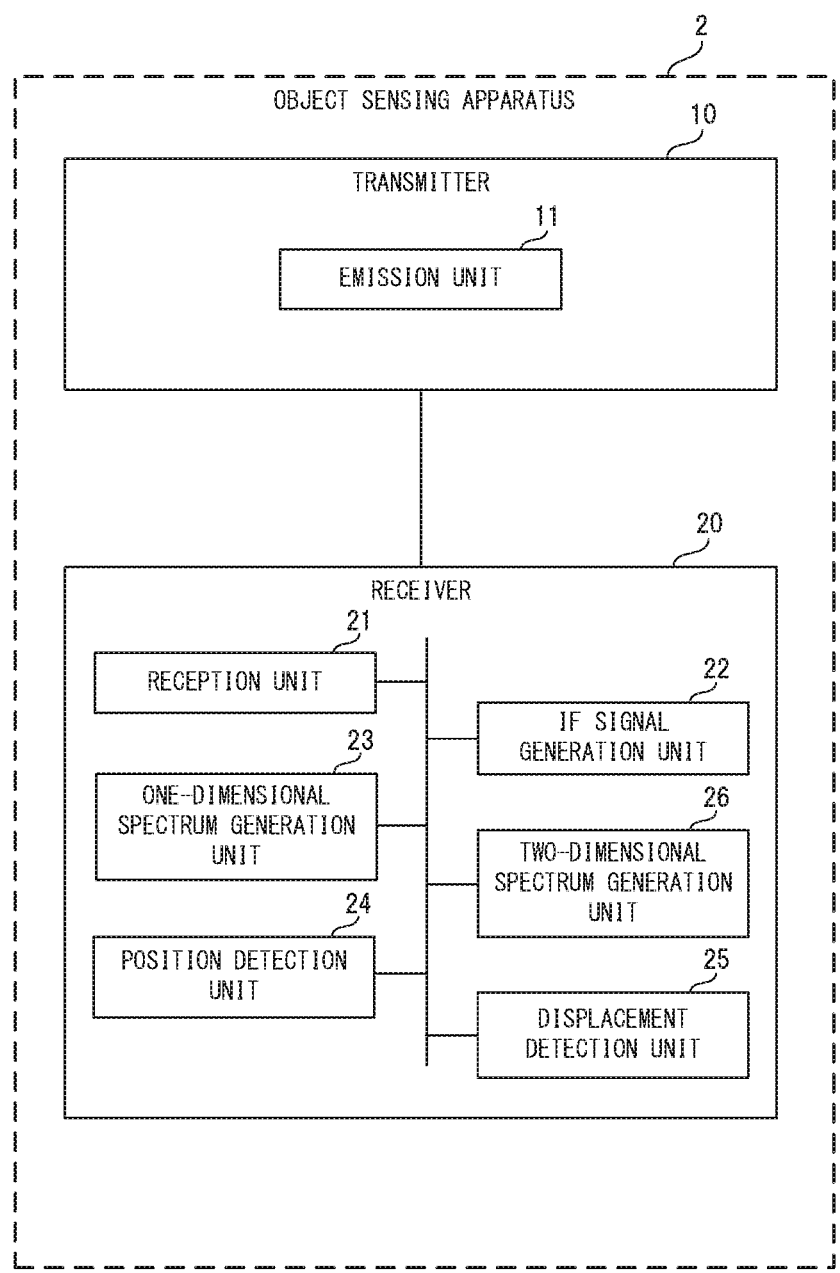
FIG. 7 is a block diagram specifically showing a configuration of an object sensing apparatus according to a second example embodiment of the present invention.

Also, if the RF reception signal $u_0(t)$ received by the reception unit 21 in the receiver 20 is the chirp signal shown in FIG. 7 for example, a delay time τ occurs between the RF transmission signal u(t) and the RF reception signal $u_0(t)$. At this time, the relationship between the phases shown in the following equation 6 is established.

$$\theta_0(t) = \theta(t - \tau) \quad \text{Equation 6}$$

Also, $R(t) = R_0 + vt$ is satisfied, where R(t) is the distance of the object. Since $\tau_0 = 2R_0/c$ is satisfied, the delay time τ is isolated as shown in the following equation 7.

$$\tau = 2R(t)/c = \tau_0 + 2vt/c \quad \text{Equation 7}$$

Here, $\tau_0$ is the delay time of the RF reception signal $u_0(0)$ with respect to the RF transmission signal u(0) output at reference time t=0. v is the movement speed of the object, and c is the speed of light.

In the above-described equation 7, 2vt/c, which is the second item on the right side, indicates the change in the delay time between the RF transmission signal u(t) and the RF reception signal $u_0(t)$ when the object moves at a velocity v. Furthermore, the following equation 8 is satisfied between the delay time $\tau_0$ and the position $R_0$ of the object at the time t=0.

$$\tau_0 = 2R_0/c \quad \text{Equation 8}$$

The IF signal generation unit 22 acquires the RF transmission signal u(t) input by the emission unit 11 and the RF reception signal $u_0(t)$ input by the reception unit 21, mixes them, and generates an IF signal for each period T. Specifically, the IF signal generation unit 22 generates an IF signal x(t) shown in the following equation 9, for example. Also, in the following equation 9, the phase $\theta_w(t)$ of the IF signal x(t) is the phase indicated by the following equation 10.

$$x(t)=\cos[\theta_w(t)] \quad \text{Equation 9}$$

$$\theta_w(t)=\theta(t)-\theta_0(t)=2\pi f_{min}\tau-\pi\alpha(\tau^2-2t_k\tau) \quad \text{Equation 10}$$

Also, in the above-described equation 10, time $t_k$ is in the range $(-T/2+\tau)<t_k<(T/2)$.

In view of this, if the position (distance from the object sensing apparatus 1 to the object) R(t) of the object is 60 meters, delay time τ=0.4 microseconds according to the above-described equation 7. Also, the typical value of $t_k$ is the chirp period T (about 100 microseconds). Accordingly, upon comparing the delay time τ and the time $t_k$ in the above-described equation 10, the delay time τ is a value that is sufficiently smaller compared to the time $t_k$.

In view of this, in the above-described equation 10, if the condition that the delay time $\tau<<t_k$ is satisfied is applied, approximation can be performed without giving consideration to the item $\tau^2$. Due to this approximation, the phase θw(t) of the IF signal x(t) can be expressed using the following equation 11.

$$\theta_w(t)=2\pi[f_{min}\tau_0+kf_dT+(f_w+f_d)t_k] \quad \text{Equation 11}$$

In the above-described equation 11, $f_d$ indicates the doppler frequency. $f_w$ indicates a frequency shift that occurs based on the delay time $\tau_0$ at the position $R_0$ of the object. Accordingly, the doppler frequency $f_d$ can be expressed using the following equation 12.

$$f_d=2vf_{min}/c \quad \text{Equation 12}$$

Also, the frequency shift $f_w$ in the above-described equation 12 can be expressed using the following equation 13.

$$f_w=\alpha\tau_0 \quad \text{Equation 13}$$

Also, in the present example embodiment, the one-dimensional spectrum generation unit 23 first generates the one-dimensional spectrum for the distance obtained using the object sensing apparatus 1 as a reference, based on the IF signal of each period. Specifically, the one-dimensional spectrum generation unit 23 performs a one-dimensional Fourier transform on the IF signal x(t) of each period T of the chirp signal. The one-dimensional spectrum (complex spectrum) $X_r(\omega,k)$ calculated by the one-dimensional spectrum generation unit 23 can be expressed as in the following equation 14. Note that although the lower end of the integration segment in the following equation 14 is originally $(-T/2)+\tau$, period T>>delay time τ is satisfied, and therefore the lower end of the integration interval is approximated to $(-T/2)$.

$$X_r(\omega,k)=\int_{-T/2}^{T/2} x(t_k)\exp(-j\omega t_k)dt_k \quad \text{Equation 14}$$

Incidentally, if a moving body such as a person serving as a sensing target is located near a fixed object such as a wall, a portion of the RF transmission signal is reflected by the fixed object and then reflected by the moving body, and thereafter is received by the reception unit 21. In this case, the IF signal x(t) can be expressed as in the following equation 15. On the right side of the following equation 15, the first item indicates the moving body reflection component, and the second item indicates the fixed object reflection component.

$$x(t)=x_{tgt}(t)+x_{sta}(t)=UU_{0_{tgt}}\cos[\theta_{w_{tgt}}(t)]+UU_{0_{sta}}\cos[\theta_{w_{sta}}(t)] \quad \text{Equation 15}$$

Figure 4:
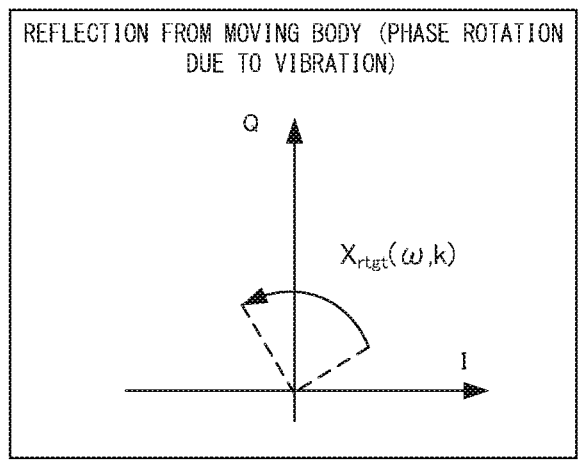
FIG. 4 is a diagram showing an example of a complex plane obtained based on a one-dimensional spectrum in a case where a moving body is located near a fixed object.
Figure 4:
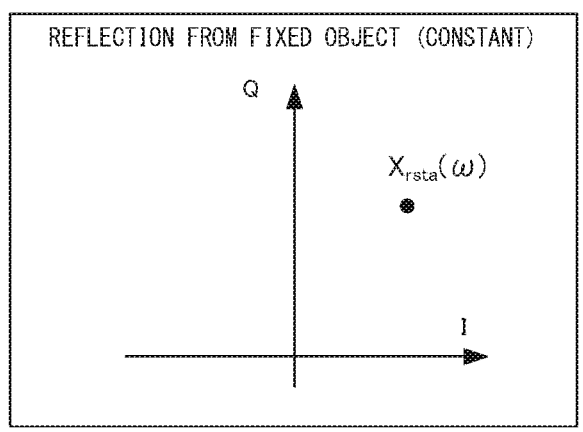
Figure 4:
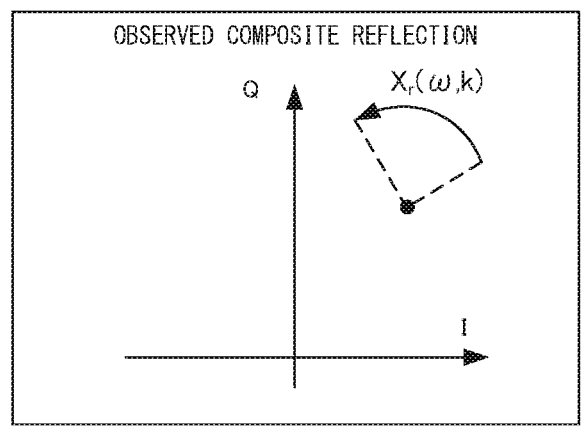

Also, as shown in the upper part of FIG. 4, if the object reflecting the RF transmission signals is a moving body and no fixed object is present nearby, a circular arc centered about an origin is obtained when the one-dimensional spectrum calculated based on the IF signal is plotted on a complex plane. On the other hand, as shown in the middle part of FIG. 4, if an object reflecting the RF transmission signals is a fixed object, the one-dimensional spectrum calculated based on the IF signal will be a point when plotted on a complex plane.

For this reason, if the moving body is located near the fixed object, the reflection of the RF transmission signal is composited, and therefore as shown in the lower part of FIG. 4, the center of the circular arc obtained by plotting the one-dimensional spectrum on the complex plane will be shifted to the position at which the fixed object is plotted. FIG. 4 shows diagrams showing an example of a complex plane obtained based on a one-dimensional spectrum in a case where a moving body is located near a fixed object. Also, in FIG. 4, the one-dimensional spectrum of the distance bin corresponding to the position of the object is plotted on the complex plane.

Also, if the moving body is located near the fixed object, the one-dimensional spectrum (complex spectrum) $X_r(\omega,k)$ can be expressed as in the following equation 16. Similarly, in equation 16 as well, the first item indicates the moving body reflection component, and the second item indicates the fixed body reflection component.

Equation 16

$$X_r(\omega,k) = \int_{-T/2}^{T/2} \{x_{tgt}(t_k) + x_{sta}(t_k)\}\exp(-j\omega t_k)dt_k =$$

$$\frac{2UU_{0_{tgt}}\exp[j2\pi(f_{min}\tau_{0_{tgt}}+kf_{d_{tgt}}T)]}{2\pi(f_{w_{tgt}}+f_{d_{tgt}})}\sin\left[\{2\pi(f_{w_{tgt}}+f_{d_{tgt}})-\omega\}\frac{T}{2}\right] +$$

$$\frac{2UU_{0_{sta}}\exp[j2\pi(f_{min}\tau_{0_{sta}})]}{2\pi f_{w_{sta}}}\sin\left[\{2\pi f_{w_{sta}}-\omega\}\frac{T}{2}\right] =$$

$$X_{r_{tgt}}(\omega,k) + X_{r_{sta}}(\omega)$$

Accordingly, in the first example embodiment, the one-dimensional spectrum generation unit 23 performs processing for removing the fixed object reflection component from the one-dimensional spectrum generated first based on the IF signals. Specifically, for each distance bin of the calculated one-dimensional spectrum, the one-dimensional spectrum generation unit 23 estimates the center $X_{rsta}(\omega)$ of a circular arc $X_r(\omega,k)$ obtained by plotting the one-dimensional spectrum of each distance bin on a complex plane. Then, the one-dimensional spectrum generation unit 23 corrects the position of the circular arc based on the estimated center and uses the corrected circular arc $X_{rtgt}(\omega,k)$ obtained for each distance bin to generate a one-dimensional spectrum with fixed object reflection removed.

Figure 5:
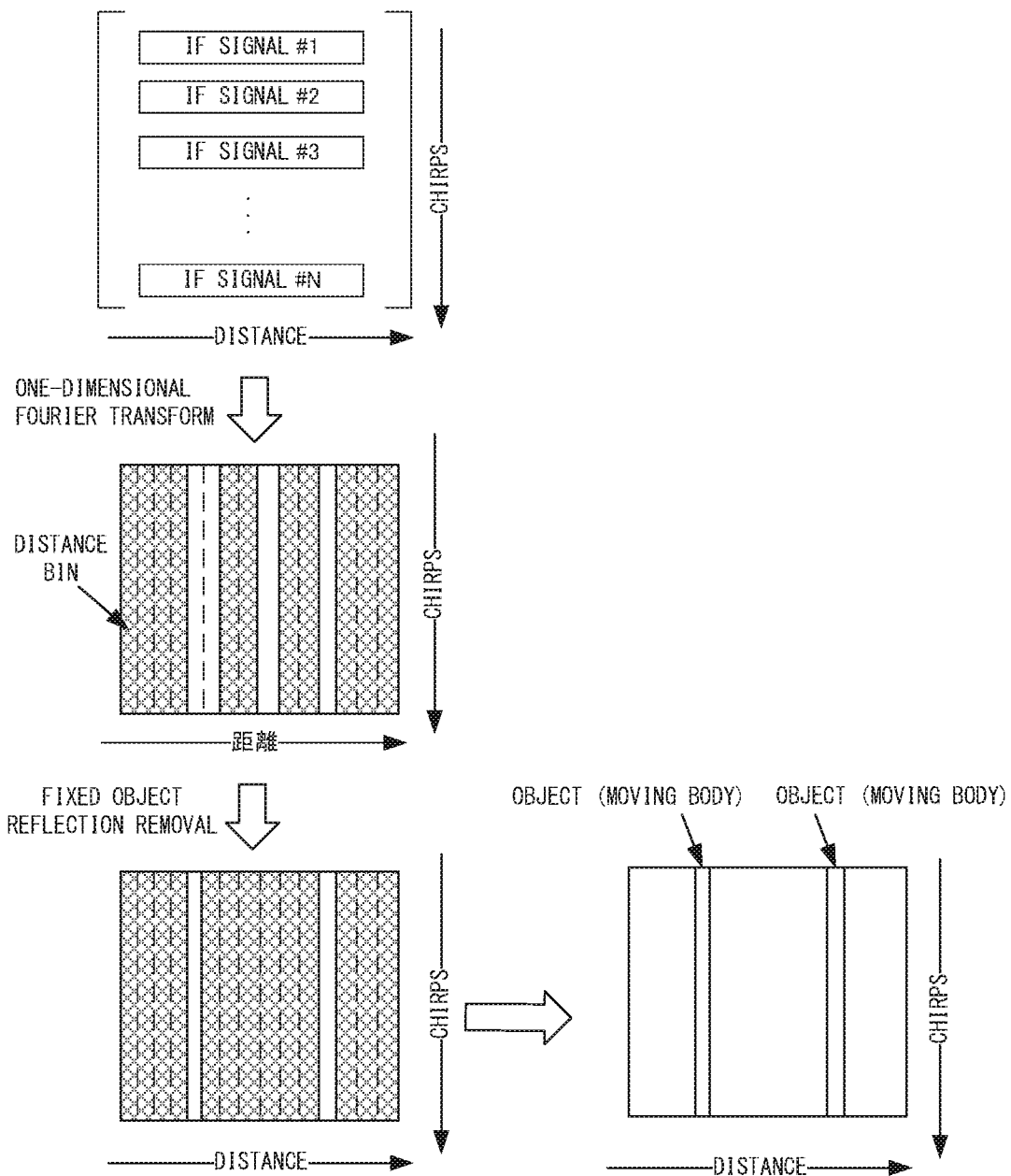
FIG. 5 is a diagram for illustrating processing performed using a one-dimensional spectrum generation unit in the first example embodiment of the present invention.

FIG. 5 is a diagram illustrating processing performed by the one-dimensional spectrum generation unit in the first example embodiment of the present invention. Note that for the purpose of description, the one-dimensional spectrum shown in FIG. 5 is obtained by deforming the actual one-dimensional spectrum and the two-dimensional spectrum.

As shown in FIG. 5, the one-dimensional spectrum obtained by first subjecting the IF signal to a Fourier transform includes the fixed object reflection component. The one-dimensional spectrum generation unit 23 removes the fixed object reflection component, and therefore the distance of the object from which the fixed object is removed can be specified based on the one-dimensional spectrum with the fixed object reflection removed.

In the first example embodiment, the position detection unit 24 detects the position of the peak of the amplitude of the one-dimensional spectrum $X_r(\omega,k)$ with the fixed object reflection removed, as the position (distance from the object to the object sensing apparatus 1) $R_0$ of the object at a reference time (t=0). Next, the position detection unit 24 detects the position of the peak of the amplitude of the one-dimensional spectrum $X_{rtgt}(\omega,k)$ with the fixed object reflection removed, as the position R(t) of the object.

Here, an equation for calculating R(t) will be described. First, letting K be the chirp count of the RF transmission signal, the phase $\angle X_{rtgt}(\omega,k)$ of the one-dimensional spectrum $X_{rtgt}(\omega,k)$ with the fixed object reflection removed can be expressed using the following equation 17.

$$\angle X_{rtgt}(\omega, k) = 2\pi(f_{min}\tau_0 + kf_d T), =$$
$$\frac{4\pi}{\lambda}(R_0 + vkT) \equiv \frac{4\pi}{\lambda}(R_0 + \alpha(kT)) \equiv \frac{4\pi}{\lambda}R(kT),$$

Equation 17

Also, in the above-described equation 17, k is an integer such as 0, 1, 2, . . . , and K. Also, a(kT) indicates the displacement (shaking/vibrating) from the initial position $R_0$. Accordingly, R(kT) indicates the position (distance from the object to the object sensing apparatus 1) of the object measured in each period T of the chirp signal. The position detection unit 24 calculates R(kT) based on the above-described equation 17.

In the first example embodiment, the displacement detection unit 25 detects the displacement a(kT) of the object based on the phase $\angle X_{rtgt}(\omega,k)$ of the one-dimensional spectrum with fixed object reflection removed at the position $R_0$ of the object, which was detected by the position detection unit 24 based on the one-dimensional spectrum with the fixed object reflection removed. Hereinafter, an equation for calculating the displacement a(kT) of the object will be described in detail.

First, based on the above-described equation 17, the position R(t) of the object can be expressed using the following equation 18.

$$R(kT)=(R_0+a(kT))$$

Equation 18

Also, the distance R(t) of the object, which is specified based on the phase $\angle X_{rtgt}(\omega,k)$ of the one-dimensional spectrum with the fixed object reflection removed, has two properties, namely (a) and (b), which are indicated below.
(a) It is not possible to obtain the absolute value of the distance R(t) of the object, which is specified based on the phase $\angle X_{rtgt}(\omega,k)$ of the one-dimensional spectrum with the fixed object reflection removed.
(b) The resolution of the phase obtained based on the change over time in the distance R(t) of the object is not limited by the distance resolution c/(2BW) resulting from the one-dimensional Fourier transform executed when calculating the one-dimensional spectrum $X_{rtgt}(\omega,k)$ with the fixed object reflection removed.

Here, the above-described property (a) will be described. The phase $\angle X_{rtgt}(\omega,k)$ of the one-dimensional spectrum with fixed object reflection removed is treated the same regardless of whether or not an indefinite constant (the phase of an integer multiple of $2\pi$) has been added. For this reason, even if an indefinite constant is added to the right side of the phase $\angle X_{rtgt}(\omega,k)$ of the one-dimensional spectrum indicated by equation 17 above, it is not possible to determine whether or not the indefinite constant has been added based on the measurement value of the phase $\angle X_{rtgt}(\omega,k)$. Accordingly, the displacement detection unit 25 cannot specify the absolute value of the distance R(t) indicated by the above-described equation 18 obtained based on the phase $\angle X_{rtgt}(\omega,k)$ of the one-dimensional spectrum with fixed object reflection removed.

However, the displacement detection unit 25 can correctly specify the displacement (shaking/vibration) a(kT) of the object obtained by removing the indefinite constant from the change over time in the distance R(t). That is, the displacement detection unit 25 can specify whether or not the object has changed position based on the change over time in the distance R(t) of the object each period of the IF signal x(t), which is indicated by the phase of the one-dimensional spectrum with fixed object reflection removed.

Accordingly, if a change over time has occurred in the distance R(t) of the object each period of the IF signal x(t) indicated by the phase of the one-dimensional spectrum with fixed object reflection removed, the displacement detection unit 25 detects that the object has changed position. Also, if no change over time has occurred in the distance R(t) of the object in each period of the IF signal x(t) indicated by the phase of the one-dimensional spectrum with fixed object reflection removed, the displacement detection unit 25 detects that the object has not changed position.

Next, the above-mentioned property (b) will be described. If the distance R(t) is specified based on the phase $\angle X_{rtgt}(\omega,k)$ of the one-dimensional spectrum with fixed object reflection removed, the resolution of the distance R(t) is limited by the phase deviation and not by the distance resolution c/(2BW) resulting from the one-dimensional Fourier transform performed when calculating the one-dimensional spectrum $X_{rtgt}(\omega,k)$ with fixed object reflection removed.

The phase $\angle X_{rtgt}(\omega,k)$ of the one-dimensional spectrum with fixed object reflection removed in the case where the phase deviation is included can be expressed using the following equation 19. In the following equation 19, $\Delta\theta$ is the phase error.

$$\angle X_{rtgt}(\omega, k) = \frac{4\pi}{\lambda}R(t) + \Delta\theta = \frac{4\pi}{\lambda}\left[R(t) + \frac{\lambda}{4\pi}\Delta\theta\right]$$

Equation 19

Also, as can be understood from equation 19 above, the error $\Delta R$ in the distance that occurs due to the phase error $\Delta\theta$ can be expressed using the following equation 20.

$$\Delta R = (\lambda/4\pi) \times \Delta\theta$$

Equation 10

In equation 20 above, $\lambda$ is the wavelength at $f_{min}$. For example, if the wavelength $\lambda$ is 4 mm ($f_{min}$=75 GHz) and the phase error $\Delta\theta$ is 3°, the error $\Delta R$ in the distance is 17 um according to equation 20 above. Therefore, in the first example embodiment, the position detection unit 24 can specify the displacement of the object at a high resolution based on the phase $\angle X_{rtgt}(\omega,k)$ of the one-dimensional spectrum.

Note that the displacement of the object specified by the position detection unit 24 is the direction of the distance R(t), that is, the direction from the object sensing apparatus 1 to the object, or the direction from the object to the object sensing apparatus 1. In the present first example embodiment, the position detection unit 24 cannot detect the displacement of the object in a direction other than the direction of the above-described distance R(t).

Apparatus Operation

Figure 6:
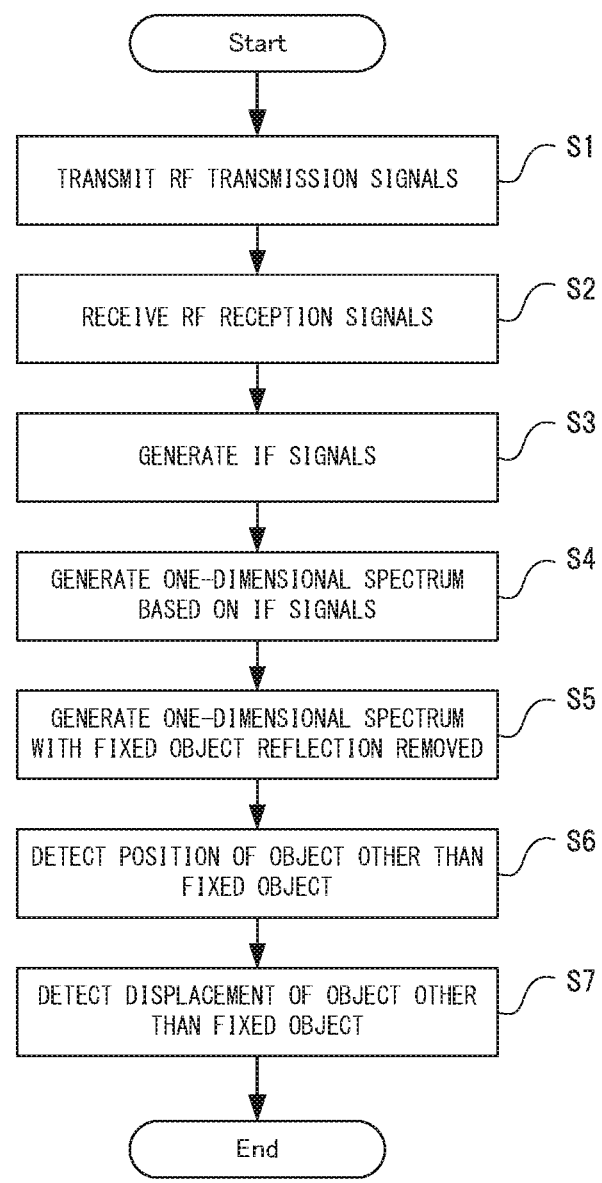
FIG. 6 is a flowchart showing operations of the object sensing apparatus according to the first example embodiment of the present invention.

Next, an operation of the object sensing apparatus 1 in the first example embodiment will be described with reference to FIG. 6. FIG. 6 is a flowchart showing operations of the object sensing apparatus according to the first example embodiment of the present invention. In the following description, FIGS. 1 to 5 will be referred to as necessary. Also, in the first example embodiment, the object sensing method is implemented by causing the object sensing apparatus 1 to operate. Accordingly, the description of the object sensing method according to the first example embodiment is substituted with the following description of operations of the object sensing apparatus 1.

As shown in FIG. 6, first, in the transmitter 10, the emission unit 11 emits the RF transmission signal subjected to periodic frequency sweeping to a pre-set space (step S1). Then, if an object that reflects the RF transmission signal is present in the space, the emitted RF transmission signal is reflected by the object. The reflected signal returns to the object sensing apparatus 1 as an RF reception signal. Also, during emission, the emission unit 11 inputs the RF transmission signal to the receiver 20 as well.

Next, the reception unit 21 receives the signal reflected by the object present in the space as the RF reception signal and inputs the received RF reception signal to the IF signal generation unit 22 (step S2).

Next, the IF signal generation unit 22 mixes the RF transmission signal input from the emission unit 11 and the RF reception signal input from the reception unit 21 to generate the IF signal in each period T (step S3).

Next, based on the IF signal of each period generated in step S3, the one-dimensional spectrum generation unit 23 generates a one-dimensional spectrum for the distance obtained using the object sensing apparatus 1 as a reference (step S4).

Next, the one-dimensional spectrum generation unit 23 uses the one-dimensional spectrum generated in step S3 to generate a one-dimensional spectrum with fixed object reflection removed, from which the signal component that is included in each IF signal and is caused by the reflection wave from a fixed object present in the emission range has been removed (step S5).

Next, the position detection unit 24 detects the position of an object other than the fixed object based on the amplitude of the one-dimensional spectrum with fixed object reflection removed (step S6). Specifically, in step S6, the position detection unit 24 detects the position of the peak of the amplitude of the one-dimensional spectrum $X_{rtgt}(\omega,k)$ with fixed object reflection removed, as the position $R_0$ of the object at a reference time (t=0). Then, the position detection unit 24 detects the position of the peak of the amplitude of the one-dimensional spectrum $X_{rtgt}(\omega,k)$ with fixed object reflection removed, as the position R(t) of the object.

Next, the displacement detection unit 25 detects the displacement of the object based on the phase of the one-dimensional spectrum with fixed object reflection removed, which corresponds to the position of the detected object (step S7). Specifically, in step S7, the displacement detection unit 25 detects the displacement a(kT) of the object based on the phase $\angle X_{rtgt}(\omega,k)$ of the one-dimensional spectrum with fixed object reflection removed, at the position $R_0$ of the object detected in step S6.

As described above, according to the first example embodiment, in the one-dimensional spectrum generated based on the IF signal, the position of the circular arc obtained by plotting on a complex plane is corrected for each distance bin, whereby a one-dimensional spectrum with fixed object reflection removed, from which the signal component caused by the reflected wave from the fixed object has been removed, is generated. Then, the position and displacement of the object other than the fixed object are estimated based on the one-dimensional spectrum with fixed object reflection removed. For this reason, according to the first example embodiment, an object (moving body) other than the fixed object can be accurately sensed in object sensing using radar.

Program

The program according to the first example embodiment need only be a program for causing a computer to execute steps S4 to S7 shown in FIG. 6. By installing the program on a computer and executing the program, it is possible to realize the object sensing apparatus 1 and the object sensing method of the first example embodiment. In this case, the CPU (Central Processing Unit) of the computer functions as the one-dimensional spectrum generation unit 23, the position detection unit 24, and the displacement detection unit 25 and performs processing.

Also, the program of the first example embodiment may also be executed by a computer system constructed by multiple computers. In this case, for example, the computers may each function as one of the one-dimensional spectrum generation unit 23, the position detection unit 24, and the displacement detection unit 25. Note that as described above, in the first example embodiment, the emission unit 11, the reception unit 21, and the IF signal generation unit 22 are constructed by dedicated hardware.

Second Example Embodiment

Next, an object sensing apparatus, an object sensing method, and a program according to a second example embodiment of the present invention will be described with reference to FIGS. 7 to 9.

Apparatus Configuration

First, a configuration of an object sensing apparatus according to the second example embodiment will be described. FIG. 7 is a block diagram specifically showing a configuration of an object sensing apparatus according to the second example embodiment of the present invention.

As shown in FIG. 7, similarly to the object sensing apparatus 1 according to first example embodiment, which is shown in FIGS. 1 and 2, the object sensing apparatus 2 according to the second example embodiment includes: an emission unit 11, a reception unit 21, an IF signal generation unit 22, a one-dimensional spectrum generation unit 23, a position detection unit 24, and a displacement detection unit 25.

However, in the second example embodiment, unlike the object sensing apparatus 1 of the first example embodiment, the object sensing apparatus 2 also further includes a two-dimensional generation unit 26 in the receiver 20. Also, accordingly, the object sensing apparatus 2 differs from the object sensing apparatus 1 of the first example embodiment also with regard to the functions of the position detection unit 24 and the displacement detection unit 25. Hereinafter, differences from the first example embodiment will mainly be described.

When a one-dimensional spectrum with fixed object reflection removed is generated by the one-dimensional spectrum generation unit 23, the two-dimensional spectrum generation unit 26 applies a one-dimensional Fourier transform to the generated one-dimensional spectrum with fixed object reflection removed and generates a two-dimensional spectrum $X(\omega,\Psi)$ of the IF signal x(t).

In the second example embodiment, the position detection unit 24 detects the position $R_O$ of the object other than the fixed object based on the position of the peak of the amplitude of the two-dimensional spectrum $X(\omega,\Psi)$ generated by the two-dimensional spectrum generation unit 26. Specifically, the position detection unit 24 detects the position of the peak of the amplitude of the two-dimensional spectrum $X(\omega,\Psi)$ indicated by the following equation 21 as the position $R_O$ of the object at the reference time (t=0).

$$X(\omega,\psi) = \sum_{k=0}^{K-1} X_r(\omega,k)\exp(-jk\psi) = \frac{2\exp(j2\pi f_{min}\tau_0)}{2\pi(f_w+f_d)-\omega} \cdot \frac{\exp[jK(2\pi f_d T - \psi)]-1}{\exp[j(2\pi f_d T - \psi)]-1}$$

Equation 21

In this manner, if the position detection unit 24 detects the position $R_O$ of the object based on the position of the peak of the amplitude of the two-dimensional spectrum $X(\omega,\Psi)$, the SN ratio undergoes $10 \log_{10}(K)$ digital improvement compared to the case where the position detection unit 24 detects the position $R_O$ of the object based on the position of the peak of the amplitude of the one-dimensional spectrum $X_r(\omega,k)$. K is the chirp count of the RF transmission signal.

Also, the two-dimensional spectrum $X(\omega,\Psi)$ is also obtained by performing a two-dimensional Fourier transform on the IF signals x(t) corresponding to the periods T of the chirp signal, and therefore the two-dimensional spectrum $X(\omega,\Psi)$ can be expressed using the one-dimensional spectrum $X_r(\omega,k)$.

Also, in the two-dimensional spectrum $X(\omega,\Psi)$ shown in equation 21, if the denominator is 0 (zero), the amplitude $|X(\omega,\Psi)|$ of the two-dimensional Fourier transform reaches its peak. Note that if the denominator reaches 0 (zero), $\omega=2\pi(f_w+f_d)\approx 2\pi f_w$ and $\Psi=2\pi f_d T$ are satisfied. Furthermore, the frequency $f_w (=\alpha R_O/c)$ and the frequency $f_d (=2vf_{min}/c)$ are obtained from the peak of the amplitude $|X(\omega,\Psi)|$ of the two-dimensional Fourier transform. Accordingly, the position detection unit 24 can calculate the position $R_O$ of the object and the velocity v of the object at time t=0 based on the frequency $f_w$ and the frequency $f_d$.

Also, the argument $\omega$ of the two-dimensional spectrum $X(\omega,\Psi)$ is proportional to the position $R_O$ of the object, and the argument $\Psi$ is proportional to the velocity v. For this reason, scale conversion is performed on the two-dimensional spectrum $X(\omega,\Psi)$ and the arguments $(\omega,\Psi)$ of the amplitude $|X(\omega,\Psi)|$ of the two-dimensional Fourier transform are replaced with the position $R_O$ and the velocity v of the object, whereby it is possible to obtain the two-dimensional plot with axes indicating the position $R_O$ and the velocity v (see FIG. 8).

Figure 8:
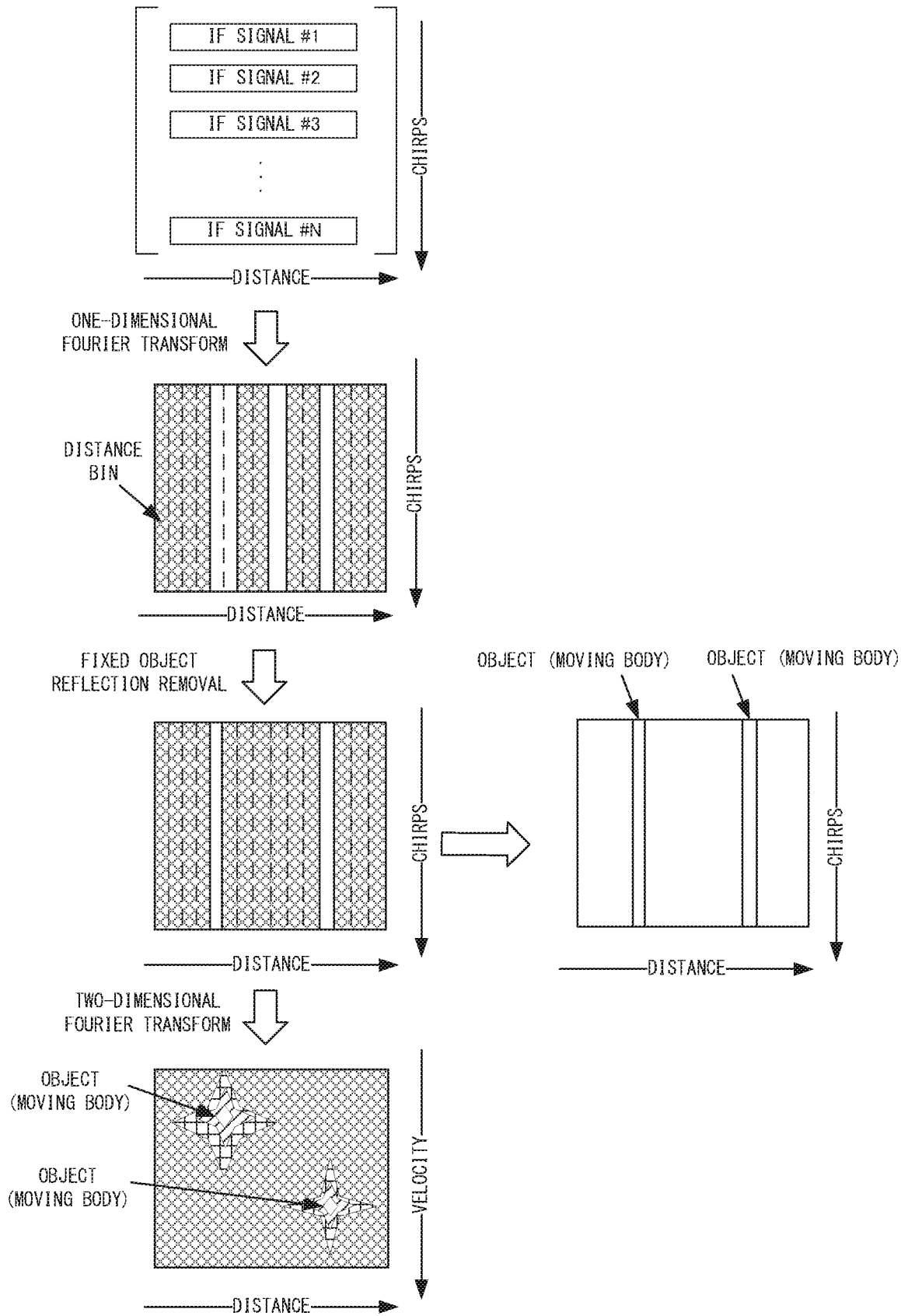
FIG. 8 is a diagram for illustrating processing performed using a one-dimensional spectrum generation unit and a two-dimensional spectrum generation unit in the second example embodiment of the present invention.

FIG. 8 is a diagram illustrating processing performed by the one-dimensional spectrum generation unit and the two-dimensional spectrum generation unit in the second example embodiment of the present invention. Note that for the sake of description, the one-dimensional spectrum and the two-dimensional spectrum shown in FIG. 8 are obtained by deforming the actual one-dimensional spectrum and two-dimensional spectrum.

As shown in FIG. 8, the one-dimensional spectrum obtained by first subjecting the IF signal to a Fourier transform includes the fixed object reflection component. The one-dimensional spectrum generation unit 23 removes the fixed object reflection component, and therefore the distance of the object from which the fixed object is removed can be specified based on the one-dimensional spectrum with the fixed object reflection removed. Also, the one-dimensional spectrum from which the fixed object reflection component has been removed is subjected to a Fourier transform to generate the two-dimensional spectrum, and therefore in the generated two-dimensional spectrum, the peak of the fixed object is removed, and only the peak of the object other than the fixed object appears.

Apparatus Operation

Next, an operation of the object sensing apparatus 2 in the second example embodiment will be described with reference to FIG. 9. FIG. 9 is a flowchart showing operations of the object sensing apparatus according to the second example embodiment of the present invention. In the following description, FIGS. 7 to 8 will be referred to as necessary. Also, in the second example embodiment, the object sensing method is implemented by causing the object sensing apparatus 2 to operate. Accordingly, the description of the object sensing method according to the second example embodiment is substituted with the following description of operations of the object sensing apparatus 2.

Figure 9:
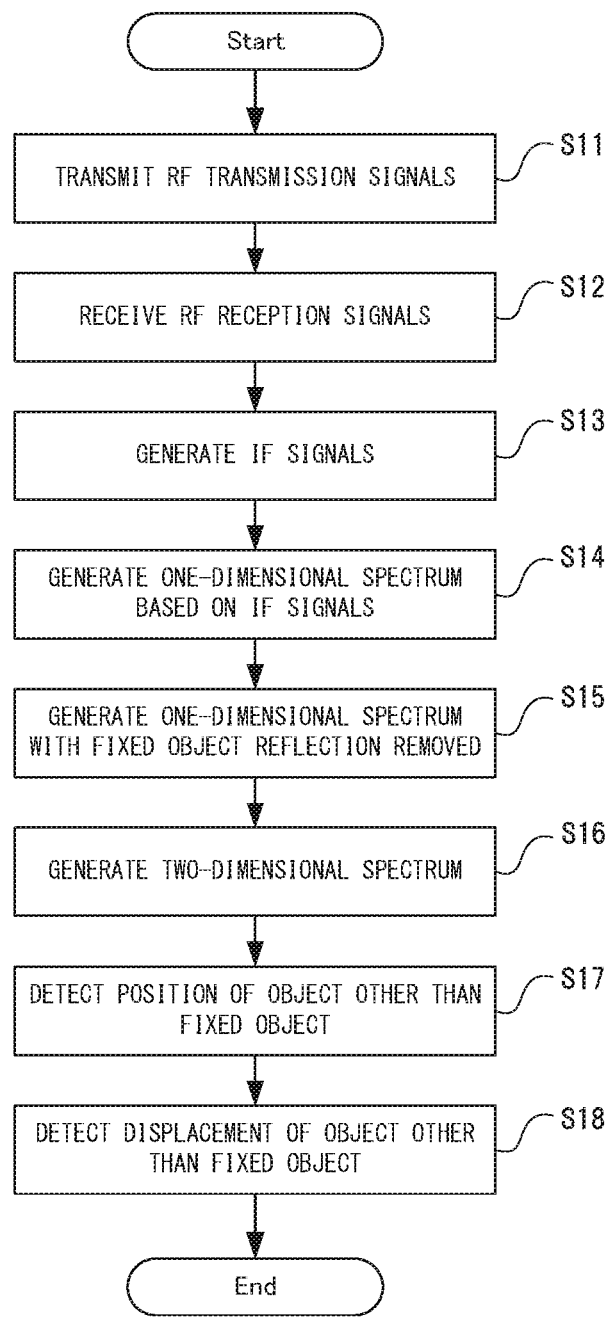
FIG. 9 is a flowchart showing operations of the object sensing apparatus according to the second example embodiment of the present invention.

As shown in FIG. 9, first, in the transmitter 10, the emission unit 11 emits the RF transmission signal subjected to periodic frequency sweeping to a pre-set space (step S11). Step S11 is a step that is similar to step S1 shown in FIG. 6.

Next, the reception unit 21 receives the signal reflected by the object present in the space as the RF reception signal and inputs the received RF reception signal to the IF signal generation unit 22 (step S12). Step S12 is a step that is similar to step S2 shown in FIG. 6.

Next, the IF signal generation unit 22 mixes the RF transmission signal input from the emission unit 11 and the RF reception signal input from the reception unit 21 to generate the IF signal in each period T (step S13). Step S13 is a step that is similar to step S3 shown in FIG. 6.

Next, based on the IF signal of each period generated in step S13, the one-dimensional spectrum generation unit 23 generates a one-dimensional spectrum for the distance obtained using the object sensing apparatus 1 as a reference (step S14). Step S14 is a step that is similar to step S4 shown in FIG. 6.

Next, the one-dimensional spectrum generation unit 23 uses the one-dimensional spectrum generated in step S13 to generate a one-dimensional spectrum with fixed object reflection removed, from which the signal component caused by the reflection wave from the fixed object present in the emission range has been removed, the signal component being included in the IF signals (step S15). Step S15 is a step that is similar to step S5 shown in FIG. 6.

Next, the two-dimensional spectrum generation unit 26 applies the one-dimensional Fourier transform to the one-dimensional spectrum with fixed object reflection removed, which was generated in step S15, to generate a two-dimensional spectrum of the IF signal (step S16).

Next, based on the amplitude of the two-dimensional spectrum generated in step S16, the position detection unit 24 detects the position of the object other than the fixed object (step S17). Specifically, in step S17, the position detection unit 24 detects the position of the peak of the amplitude of the two-dimensional spectrum $X(\omega,\Psi)$ as the position $R_0$ of the object at the reference time (t=0).

Next, the displacement detection unit 25 detects the displacement of the object based on the phase of the one-dimensional spectrum with fixed object reflection removed, which corresponds to the position of the detected object (step S18). Specifically, in step S18, the displacement detection unit 25 detects the displacement a(kT) of the object based on the phase $\angle X_{rtgt}(\omega,k)$ of the one-dimensional spectrum with fixed object reflection removed at the position $R_0$ of the object detected in step S17.

As described above, according to the second example embodiment, the position of the object is detected based on the two-dimensional spectrum, and therefore the accuracy of the detection of the position of the object in a space with a lot of noise is improved compared to the first example embodiment. Also, in the second example embodiment as well, an effect similar to that of the first example embodiment is obtained.

Program

The program according to the second example embodiment need only be a program for causing a computer to execute steps S14 to S18 shown in FIG. 9. By installing the program on a computer and executing the program, it is possible to realize the object sensing apparatus 2 and the object sensing method of the second example embodiment. In this case, the CPU (Central Processing Unit) of the computer functions as the one-dimensional spectrum generation unit 23, the position detection unit 24, the displacement detection unit 25, and the two-dimensional spectrum generation unit 26, and performs processing.

Also, the program of the second example embodiment may also be executed by a computer system constructed by multiple computers. In this case, for example, the computers may also each function as one of the one-dimensional spectrum generation unit 23, the position detection unit 24, the displacement detection unit 25, and the two-dimensional spectrum generation unit 26. Note that as described above, in the second example embodiment, the emission unit 11, the reception unit 21, and the IF signal generation unit 22 are constructed by dedicated hardware.

Third Example Embodiment

Next, an object sensing apparatus, an object sensing method, and a program according to a third example embodiment of the present invention will be described with reference to FIG. 10.

Apparatus Configuration

First, a configuration of an object sensing apparatus according to the third example embodiment will be described. The object sensing apparatus of the third example embodiment is formed similarly to the object sensing apparatus 2 of the second example embodiment shown in FIG. 7, and includes: an emission unit 11; a reception unit 21; an IF signal generation unit 22; a one-dimensional spectrum generation unit 23; a position detection unit 24; a displacement detection unit 25; and a two-dimensional spectrum generation unit 26. However, the third example embodiment differs from the first and second example embodiments in the processing performed by the one-dimensional spectrum generation unit 23. Hereinafter, differences from the first and second example embodiments will mainly be described.

In the third example embodiment, the one-dimensional spectrum generation unit 23 generates a one-dimensional spectrum and then selects a specific distance bin of the one-dimensional spectrum based on the amplitude of the one-dimensional spectrum. Specifically, the one-dimensional spectrum generation unit 23 determines whether or not the amplitude of the one-dimensional spectrum is greater than or equal to a threshold value in each distance bin, and selects the distance bins in which the amplitude is greater than or equal to the threshold value.

Next, for the selected distance bin, the one-dimensional spectrum generation unit 23 estimates the center of the arc obtained by plotting the one-dimensional spectrum for that distance bin on a complex plane, and corrects the position of the circular arc based on the estimated center. Thereafter, the one-dimensional spectrum generation unit 23 uses the corrected circular arc of the selected distance bin to generate a one-dimensional spectrum with fixed object reflection removed.

Apparatus Operation

Next, an operation of the object sensing apparatus in the third example embodiment will be described with reference to FIG. 10. FIG. 10 is a flowchart showing operations of the object sensing apparatus according to the third example embodiment of the present invention. Also, in the third example embodiment, the object sensing method is implemented by causing the object sensing apparatus to operate. Accordingly, the description of the object sensing method according to the third example embodiment is substituted with the following description of operations of the object sensing apparatus.

Figure 10:
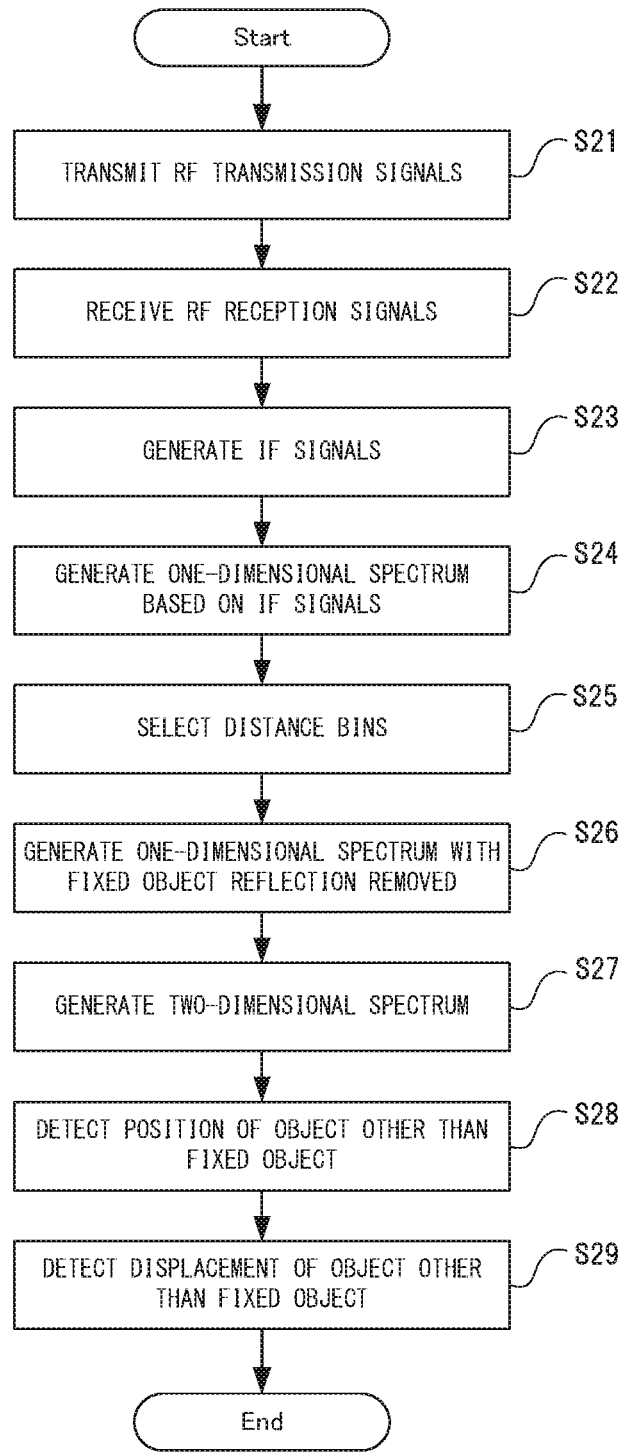
FIG. 10 is a flowchart showing operations of an object sensing apparatus according to a third example embodiment of the present invention.

As shown in FIG. 10, first, in the transmitter 10, the emission unit 11 emits the RF transmission signal subjected to periodic frequency sweeping to a pre-set space (step S21). Step S21 is a step that is similar to step S1 shown in FIG. 6.

Next, the reception unit 21 receives the signal reflected by the object present in the space as the RF reception signal and inputs the received RF reception signal to the IF signal generation unit 22 (step S22). Step S22 is a step that is similar to step S2 shown in FIG. 6.

Next, the IF signal generation unit 22 mixes the RF transmission signal input from the emission unit 11 and the RF reception signal input from the reception unit 21 to generate the IF signal in each period T (step S23). Step S23 is a step that is similar to step S3 shown in FIG. 6.

Next, based on the IF signal of each period generated in step S13, the one-dimensional spectrum generation unit 23 generates a one-dimensional spectrum for the distance obtained using the object sensing apparatus 1 as a reference (step S24). Step S24 is a step that is similar to step S4 shown in FIG. 6.

Next, based on the amplitude of the one-dimensional spectrum generated in step S24, the one-dimensional spectrum generation unit 23 selects a specific distance bin of the one-dimensional spectrum (step S25). Specifically, the one-dimensional spectrum generation unit 23 determines whether or not the amplitude of the one-dimensional spectrum is greater than or equal to a threshold value in each distance bin, and selects the distance bins in which the amplitude is greater than or equal to the threshold value.

Next, for each distance bin selected in step S25, the one-dimensional spectrum generation unit 23 estimates the center of the circular arc obtained by plotting a one-dimensional spectrum of the distance bin on a complex plane and corrects the position of the circular arc based on the estimated center. Also, the one-dimensional spectrum generation unit 23 uses the corrected circular arc for the selected distance bin to generate a one-dimensional spectrum with fixed object reflection removed (step S26).

Next, the two-dimensional spectrum generation unit 26 applies the one-dimensional Fourier transform to the one-dimensional spectrum with fixed object reflection removed, which was generated in step S25, to generate a two-dimensional spectrum of the IF signal (step S27). Step S27 is a step that is similar to step S16 shown in FIG. 9.

Next, based on the amplitude of the two-dimensional spectrum generated in step S27, the position detection unit 24 detects the position of the object other than the fixed object (step S28). Step S28 is a step that is similar to step S17 shown in FIG. 9.

Next, the displacement detection unit 25 detects the displacement of the object based on the phase of the one-dimensional spectrum with fixed object reflection removed, which corresponds to the position of the detected object (step S29). Step S29 is a step that is similar to step S18 shown in FIG. 9.

As described above, in the first and second example embodiments, the circular arc is estimated and position correction is performed for all of the distance bins, whereas in the third example embodiment, the circular arc estimation and position correction are performed only for specific distance bins. For this reason, according to the third example embodiment, the needed calculation amount can be reduced compared to the first and second example embodiments. Also, in the third example embodiment as well, an effect similar to that of the first example embodiment is obtained.

Program

The program of the third example embodiment need only be a program for causing a computer to execute steps S24 to S29 shown in FIG. 10. By installing the program on a computer and executing the program, it is possible to realize the object sensing apparatus and the object sensing method of the third example embodiment. In this case, the CPU (Central Processing Unit) of the computer functions as the one-dimensional spectrum generation unit 23, the position detection unit 24, the displacement detection unit 25, and the two-dimensional spectrum generation unit 26, and performs processing.

Also, the program of the third example embodiment may also be executed by a computer system constructed by multiple computers. In this case, for example, the computers may also each function as one of the one-dimensional spectrum generation unit 23, the position detection unit 24, the displacement detection unit 25, and the two-dimensional spectrum generation unit 26. Note that as described above, in the third example embodiment, the emission unit 11, the reception unit 21, and the IF signal generation unit 22 are constructed by dedicated hardware.

Fourth Example Embodiment

Next, an object sensing apparatus, an object sensing method, and a program according to a fourth example embodiment of the present invention will be described with reference to FIGS. 11 and 12.

Apparatus Configuration

First, a configuration of an object sensing apparatus according to the fourth example embodiment will be described. The object sensing apparatus of the fourth example embodiment is formed similarly to the object sensing apparatus 2 of the second example embodiment shown in FIG. 7, and includes: an emission unit 11; a reception unit 21; an IF signal generation unit 22; a one-dimensional spectrum generation unit 23; a position detection unit 24; a displacement detection unit 25; and a two-dimensional spectrum generation unit 26. However, the fourth example embodiment differs from the first and second example embodiments in the processing performed by the one-dimensional spectrum generation unit 23. Hereinafter, differences from the first and second example embodiments will mainly be described.

In the fourth example embodiment, the one-dimensional spectrum generation unit 23 also generates a two-dimensional spectrum, in addition to a one-dimensional spectrum, based on the IF signal of each period. Then, the one-dimensional spectrum generation unit 23 selects a specific distance bin of the one-dimensional spectrum based on the amplitude of the generated two-dimensional spectrum. Specifically, the one-dimensional spectrum generation unit 23 determines whether or not the amplitude of the corresponding two-dimensional spectrum is greater than or equal to a threshold value in each distance bin, and selects the distance bins in which the amplitude is greater than or equal to the threshold value.

Next, for the selected distance bin, the one-dimensional spectrum generation unit 23 estimates the center of the arc obtained by plotting the one-dimensional spectrum at that distance bin on a complex plane, and corrects the position of the circular arc based on the estimated center. Thereafter, the one-dimensional spectrum generation unit 23 uses the corrected circular arc of the selected distance bin to generate a one-dimensional spectrum with fixed object reflection removed.

Figure 11:
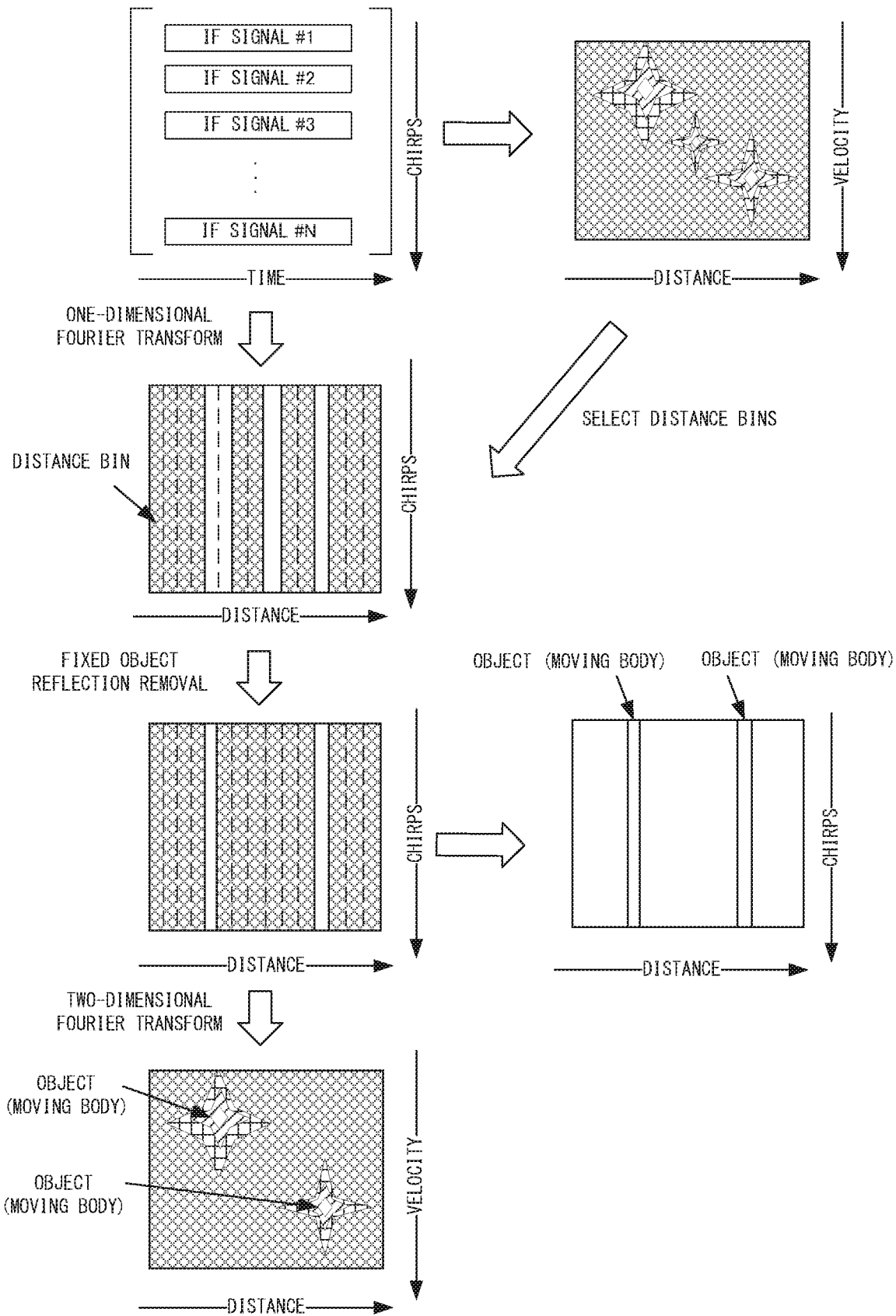
FIG. 11 is a diagram for illustrating processing performed using a one-dimensional spectrum generation unit and a two-dimensional spectrum generation unit in a fourth example embodiment of the present invention.

FIG. 11 is a diagram for illustrating processing performed using a one-dimensional spectrum generation unit and a two-dimensional spectrum generation unit in the fourth example embodiment of the present invention. Note that for the sake of description, the one-dimensional spectrum and the two-dimensional spectrum shown in FIG. 11 are obtained by deforming the actual one-dimensional spectrum and the two-dimensional spectrum.

As shown in FIG. 11, the one-dimensional spectrum and the two-dimensional spectrum are generated by first applying a Fourier transform to the IF signal, but both the one-dimensional spectrum and the two-dimensional spectrum include fixed object reflection components. The one-dimensional spectrum generation unit 23 predicts the presence of a fixed object based on the peak of the two-dimensional spectrum and selects a specific distance bin of the first spectrum based on the prediction result.

Also, in the fourth example embodiment, a Fourier transform based on the one-dimensional spectrum from which the fixed object reflection component has been removed is also performed to newly generate a two-dimensional spectrum, but in the two-dimensional spectrum, the peak of the fixed object is removed and only the peak of the object other than the fixed object appears.

Apparatus Operation

Next, an operation of the object sensing apparatus in the fourth example embodiment will be described with reference to FIG. 12. FIG. 12 is a flowchart showing operations of the object sensing apparatus according to the fourth example embodiment of the present invention. Also, in the fourth example embodiment, the object sensing method is implemented by causing the object sensing apparatus to operate. Accordingly, the description of the object sensing method according to the fourth example embodiment is substituted with the following description of operations of the object sensing apparatus.

Figure 12:
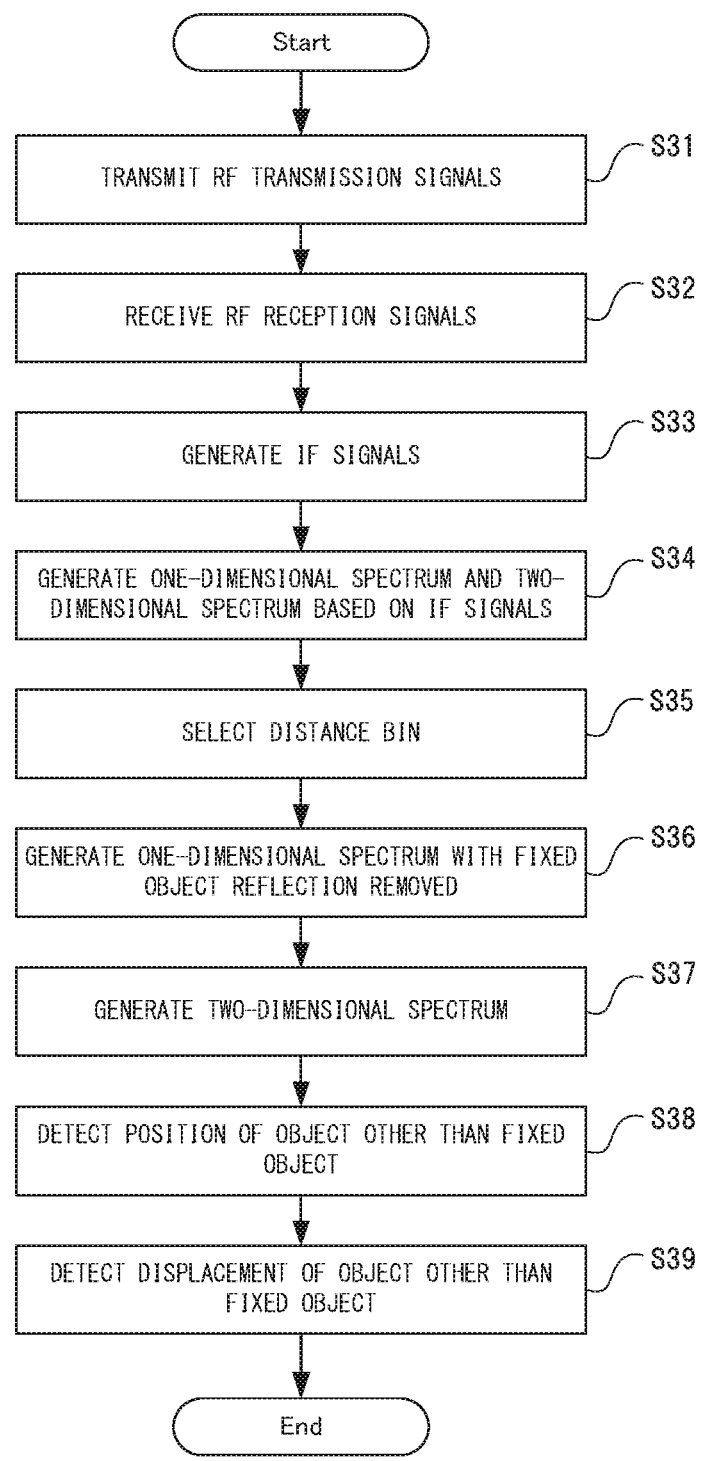
FIG. 12 is a flowchart showing operations of an object sensing apparatus according to the fourth example embodiment of the present invention.

As shown in FIG. 12, first, in the transmitter 10, the emission unit 11 emits the RF transmission signal subjected to periodic frequency sweeping to a pre-set space (step S31). Step S31 is a step that is similar to step S1 shown in FIG. 6.

Next, the reception unit 21 receives the signal reflected by the object present in the space as the RF reception signal and inputs the received RF reception signal to the IF signal generation unit 22 (step S32). Step S32 is a step that is similar to step S2 shown in FIG. 6.

Next, the IF signal generation unit 22 mixes the RF transmission signal input from the emission unit 11 and the RF reception signal input from the reception unit 21 to generate the IF signal in each period T (step S33). Step S33 is a step that is similar to step S3 shown in FIG. 6.

Next, based on the IF signal of each period generated in step S33, the one-dimensional spectrum generation unit 23 generates a one-dimensional spectrum and a two-dimensional spectrum for the distance obtained using the object sensing apparatus 1 as a reference (step S34).

Next, based on the amplitude of the two-dimensional spectrum generated in step S34, the one-dimensional spectrum generation unit 23 selects a specific distance bin of the one-dimensional spectrum (step S35). Specifically, the one-dimensional spectrum generation unit 23 determines whether or not the amplitude of the two-dimensional spectrum is greater than or equal to a threshold value in each distance bin, and selects the distance bins in which the amplitude is greater than or equal to the threshold value.

Next, for each distance bin selected in step S35, the one-dimensional spectrum generation unit 23 estimates the center of a circular arc obtained by plotting a one-dimensional spectrum of the distance bin on a complex plane and corrects the position of the circular arc based on the estimated center. Also, the one-dimensional spectrum generation unit 23 uses the corrected circular arc for the selected distance bin to generate a one-dimensional spectrum with fixed object reflection removed (step S36).

Next, the two-dimensional spectrum generation unit 26 applies the one-dimensional Fourier transform to the one-dimensional spectrum with fixed object reflection removed, which was generated in step S36, to generate a two-dimensional spectrum of the IF signal (step S37). Step S37 is a step that is similar to step S16 shown in FIG. 9.

Next, based on the amplitude of the two-dimensional spectrum generated in step S37, the position detection unit 24 detects the position of the object other than the fixed object (step S38). Step S38 is a step that is similar to step S17 shown in FIG. 9.

Next, the displacement detection unit 25 detects the displacement of the object based on the phase of the one-dimensional spectrum with fixed object reflection removed, which corresponds to the position of the detected object (step S39). Step S39 is a step that is similar to step S18 shown in FIG. 9.

As described above, in the first and second example embodiments, the circular arc is estimated and position correction is performed for all of the distance bins, whereas in the fourth example embodiment, the circular arc estimation and position correction are performed only for specific distance bins. For this reason, according to the fourth example embodiment, the needed calculation amount can be reduced compared to the first and second example embodiments. Also, in the fourth example embodiment as well, an effect similar to that of the first example embodiment is obtained.

Program

The program of the fourth example embodiment need only be a program for causing a computer to execute steps S34 to S39 shown in FIG. 12. By installing the program on a computer and executing the program, it is possible to realize the object sensing apparatus and the object sensing method of the fourth example embodiment. In this case, the CPU (Central Processing Unit) of the computer functions as the one-dimensional spectrum generation unit 23, the position detection unit 24, the displacement detection unit 25, and the two-dimensional spectrum generation unit 26, and performs processing.

Also, the program of the fourth example embodiment may also be executed by a computer system constructed by multiple computers. In this case, for example, the computers may also each function as one of the one-dimensional spectrum generation unit 23, the position detection unit 24, the displacement detection unit 25, and the two-dimensional spectrum generation unit 26. Note that as described above, in the fourth example embodiment, the emission unit 11, the reception unit 21, and the IF signal generation unit 22 are constructed by dedicated hardware.

Physical Configuration

Figure 13:
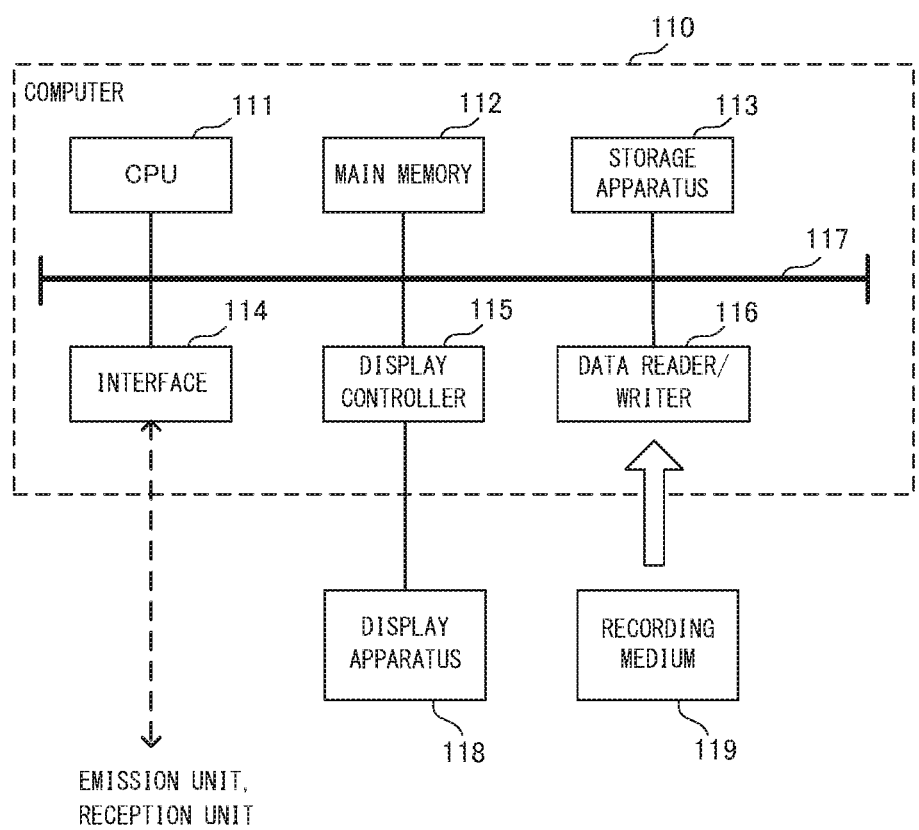
FIG. 13 is a block diagram showing an example of a computer for realizing an object sensing apparatus in the first to fourth example embodiments of the present invention.

Here, a computer for executing the program according to the first to fourth example embodiments will be described with reference to FIG. 13. FIG. 13 is a block diagram showing an example of a computer for realizing an object sensing apparatus according to the first to fourth example embodiments of the present invention.

As shown in FIG. 10, a computer 110 includes: a CPU 111; a main memory 112; a storage apparatus 113; an interface 114; a display controller 115; and a data reader/writer 116. These units are connected via a bus 121 so as to be able to mutually perform data communication.

The CPU 111 deploys the programs (codes) of the present example embodiment, which are stored in the storage apparatus 113, to the main memory 112, and executes them in a predetermined order to carry out various types of computation. The main memory 112 is typically a volatile storage apparatus such as a DRAM (Dynamic Random Access Memory). Also, the programs according to the first to fourth example embodiments are provided stored in a computer readable recording medium 120. Also, the programs according to the first to fourth example embodiments may also be distributed on the Internet, which is connected to via a communication interface 117.

Also, specific examples of the storage apparatus 113 include a hard disk drive, as well as a semiconductor storage apparatus such as a flash memory. The input interface 114 mediates data transfer between the CPU 111 and various types of hardware such as the emission unit 11 and the reception unit 21. The display controller 115 is connected to the display apparatus 118 and controls display on the display apparatus 118.

The data reader/writer 116 mediates data transfer between the CPU 111 and the recording medium 119 and executes readout of programs from the recording medium 119 and writing of the processing results obtained by the computer 110 in the recording medium 119.

Also, specific examples of the recording medium 119 include: a general-purpose semiconductor storage device such as a CF (Compact Flash (registered trademark)) and an SD (Secure Digital); a magnetic recording medium such as a flexible disk; or an optical recording medium such as a CD-ROM (Compact Disk Read Only Memory).

Note that the portions other than the emission unit 11 and the reception unit 21 of the object sensing apparatus according to the first to fourth example embodiments can also be realized by using hardware, instead of using a computer in which programs are installed. Furthermore, some of the portions other than the emission unit 11 and the reception unit 21 of the object sensing apparatus may also be realized by a program, and the remaining portion may be realized using hardware.

Some or all of the above-described example embodiments can be realized according to Supplementary Note 1 to Supplementary Note 18, which are described hereinafter, but the present invention is not limited to the following description.

Supplementary Note 1

An object sensing apparatus including:

an emission unit configured to emit an RF transmission signal subjected to periodic frequency sweeping, in each period;

a reception unit configured to receive a reflected wave of the RF transmission signal reflected by an object as an RF reception signal;

an IF signal generation unit configured to generate an IF signal in each of the periods by mixing the RF transmission signal and the RF reception signal;

a one-dimensional spectrum generation unit configured to generate a one-dimensional spectrum with respect to distance obtained using the object sensing apparatus as a reference, based on the IF signal of each period, and use the generated one-dimensional spectrum to generate a one-dimensional spectrum with fixed object reflection removed, from which a signal component that is included in the IF signal and is caused by a reflected wave from a fixed object present in an emission range has been removed;

a position detection unit configured to detect a position of an object other than the fixed object based on the amplitude of the one-dimensional spectrum with fixed object reflection removed; and a displacement detection unit configured to detect displacement of the object other than the fixed object, based on the phase of the one-dimensional spectrum with fixed object reflection removed, which corresponds to the detected position of the object other than the fixed object.

Supplementary Note 2

The object sensing apparatus according to Supplementary Note 1, wherein
for each distance bin, the one-dimensional spectrum generation unit estimates a center of a circular arc obtained by plotting the one-dimensional spectrum for the distance bin on a complex plane, corrects the position of the circular arc based on the estimated center, and uses the corrected circular arc obtained for each distance bin to generate the one-dimensional spectrum with fixed object reflection removed.

Supplementary Note 3

The object sensing apparatus according to Supplementary Note 1, wherein
the one-dimensional spectrum generation unit selects a specific distance bin of the one-dimensional spectrum based on the amplitude of the one-dimensional spectrum, and for the selected distance bin, estimates the center of a circular arc obtained by plotting the one-dimensional spectrum for the distance bin on a complex plane, corrects the position of the circular arc based on the estimated center, and uses the corrected circular arc for the selected bin to generate the one-dimensional spectrum with fixed object reflection removed.

Supplementary Note 4

The object sensing apparatus according to Supplementary Note 1, wherein
the one-dimensional spectrum generation unit generates a two-dimensional spectrum based on the IF signal of each period, selects a specific distance bin of the one-dimensional spectrum based on the amplitude of the generated two-dimensional spectrum, and for the selected distance bin, estimates the center of a circular arc obtained by plotting the one-dimensional spectrum for the distance bin on a complex plane, corrects the position of the circular arc based on the estimated center, and uses the corrected circular arc for the selected bin to generate the one-dimensional spectrum with fixed object reflection removed.

Supplementary Note 5

The object sensing apparatus according to any one of Supplementary Notes 1 to 4, further including
a two-dimensional spectrum generation unit configured to generate a two-dimensional spectrum of the IF signal by applying a one-dimensional Fourier transform to the one-dimensional spectrum with fixed object reflection removed,
wherein the position detection unit detects the position of the object other than the fixed object based on the position of a peak of the amplitude of the two-dimensional spectrum generated based on the one-dimensional spectrum with fixed object reflection removed.

Supplementary Note 6

The object sensing apparatus according to Supplementary Note 5, wherein
the displacement detection unit detects displacement of the object other than the fixed object based on the phase of the one-dimensional spectrum with fixed object reflection removed, which corresponds to the position of the object other than the fixed object detected based on the two-dimensional spectrum.

Supplementary Note 7

An object sensing method including: (a) a step of emitting an RF transmission signal subjected to periodic frequency sweeping, in each period;

(b) a step of receiving a reflected wave of the RF transmission signal reflected by an object as an RF reception signal;

(c) a step of generating an IF signal in each of the periods by mixing the RF transmission signal and the RF reception signal;

(d) a step of generating a one-dimensional spectrum with respect to distance obtained using the emitting position of the RF transmission signal or the receiving position of the RF reception signal as a reference, based on the IF signal of each period, and using the generated one-dimensional spectrum to generate a one-dimensional spectrum with fixed object reflection removed, from which a signal component that is included in the IF signal and is caused by a reflected wave from a fixed object present in an emission range has been removed;

(e) a step of detecting a position of an object other than the fixed object based on the amplitude of the one-dimensional spectrum with fixed object reflection removed; and (f) a step of detecting displacement of the object other than the fixed object, based on the phase of the one-dimensional spectrum with fixed object reflection removed, which corresponds to the detected position of the object other than the fixed object.

Supplementary Note 8

The object sensing method according to Supplementary Note 7, wherein in the (d) step, for each distance bin, a center of a circular arc obtained by plotting the one-dimensional spectrum for the distance bin on a complex plane is estimated, the position of the circular arc is corrected based on the estimated center, and the corrected circular arc obtained for each distance bin is used to generate the one-dimensional spectrum with fixed object reflection removed.

Supplementary Note 9

The object sensing method according to Supplementary Note 7, wherein in the (d) step, a specific distance bin of the one-dimensional spectrum is selected based on the amplitude of the one-dimensional spectrum, and for the selected distance bin, the center of a circular arc obtained by plotting the one-dimensional spectrum for the distance bin on a complex plane is estimated, the position of the circular arc is corrected based on the estimated center, and the corrected circular arc of the selected distance bin is used to generate the one-dimensional spectrum with fixed object reflection removed.

Supplementary Note 10

The object sensing method according to Supplementary Note 7, wherein in the (d) step, a two-dimensional spectrum is generated based on the IF signal of each of the periods, a specific distance bin of the one-dimensional spectrum is selected based on the amplitude of the generated two-dimensional spectrum, and for the selected distance bin, the center of a circular arc obtained by plotting the one-dimensional spectrum for the distance bin on a complex plane is estimated, the position of the circular arc is corrected based on the estimated center, and the corrected circular arc of the selected distance bin is used to generate the one-dimensional spectrum with fixed object reflection removed.

Supplementary Note 11

The object sensing method according to any one of Supplementary Notes 8 to 10, further including (g) a step of generating a two-dimensional spectrum of the IF signal by applying a one-dimensional Fourier transform to the one-dimensional spectrum with fixed object reflection removed, wherein in the (e) step, the position of the object other than the fixed object is detected based on the position of a peak of the amplitude of the two-dimensional spectrum generated based on the one-dimensional spectrum with fixed object reflection removed.

Supplementary Note 12

The object sensing method according to Supplementary Note 11, wherein in the (f) step, displacement of the object other than the fixed object is detected based on the phase of the one-dimensional spectrum with fixed object reflection removed, which corresponds to the position of the object other than the fixed object detected based on the two-dimensional spectrum.

Supplementary Note 13

A computer readable recording medium in an object sensing apparatus including: an emission unit for emitting an RF transmission signal subjected to periodic frequency sweeping, in each period; a reception unit configured to receive a reflected wave of the RF transmission signal reflected by an object as an RF reception signal; an IF signal generation unit for generating an IF signal in each of the periods by mixing the RF transmission signal and the RF reception signal; and a processor, the computer readable recording medium including a program recorded thereon, the program including instructions that cause the processor to carry out:

(a) a step of generating a one-dimensional spectrum with respect to distance obtained using the object sensing apparatus as a reference, based on the IF signal of each period, and using the generated one-dimensional spectrum to generate a one-dimensional spectrum with fixed object reflection removed, from which a signal component that is included in the IF signal and is caused by a reflected wave from a fixed object present in an emission range has been removed;

(b) a step of detecting a position of an object other than the fixed object based on the amplitude of the one-dimensional spectrum with fixed object reflection removed; and (c) a step of detecting displacement of the object other than the fixed object, based on the phase of the one-dimensional spectrum with fixed object reflection removed, which corresponds to the detected position of the object other than the fixed object.

Supplementary Note 14

The computer readable recording medium according to Supplementary Note 13, wherein
in the (a) step, for each distance bin, a center of a circular arc obtained by plotting the one-dimensional spectrum for the distance bin on a complex plane is estimated, the position of the circular arc is corrected based on the estimated center, and the corrected circular arc obtained for each distance bin is used to generate the one-dimensional spectrum with fixed object reflection removed.

Supplementary Note 15

The computer readable recording medium according to Supplementary Note 13, wherein
in the (a) step, a specific distance bin of the one-dimensional spectrum is selected based on the amplitude of the one-dimensional spectrum, and for the selected distance bin, the center of a circular arc obtained by plotting the one-dimensional spectrum for the distance bin on a complex plane is estimated, the position of the circular arc is corrected based on the estimated center, and the corrected circular arc of the selected distance bin is used to generate the one-dimensional spectrum with fixed object reflection removed.

Supplementary Note 16

The computer readable recording medium according to Supplementary Note 13, wherein
in the (a) step, a two-dimensional spectrum is generated based on the IF signal of each of the periods, a specific distance bin of the one-dimensional spectrum is selected based on the amplitude of the generated two-dimensional spectrum, and for the selected distance bin, the center of a circular arc obtained by plotting the one-dimensional spectrum for the distance bin on a complex plane is estimated, the position of the circular arc is corrected based on the estimated center, and the corrected circular arc of the selected distance bin is used to generate the one-dimensional spectrum with fixed object reflection removed.

Supplementary Note 17

The computer readable recording medium according to any one of Supplementary Notes 14 to 16, further including
(d) a step of generating a two-dimensional spectrum of the IF signal by applying a one-dimensional Fourier transform to the one-dimensional spectrum with fixed object reflection removed,
wherein in the (b) step, the position of the object other than the fixed object is detected based on the position of a peak of the amplitude of the two-dimensional spectrum generated based on the one-dimensional spectrum with fixed object reflection removed.

Supplementary Note 18

The computer readable recording medium according to Supplementary Note 17, wherein
in the (c) step, displacement of the object other than the fixed object is detected based on the phase of the one-dimensional spectrum with fixed object reflection removed, which corresponds to the position of the object other than the fixed object detected based on the two-dimensional spectrum.

Although the invention of the present application has been described above with reference to example embodiments, the invention of the present application is not limited to the above-described example embodiments. The configuration and details of the invention of the present application can be modified in various ways that can be understood by a person skilled in the art within the scope of the invention of the present application.

INDUSTRIAL APPLICABILITY

According to the present invention as described above, the moving body can be accurately sensed in object sensing using radar. The present invention is useful in various fields in which sensing of an object is performed using radar.

LIST OF REFERENCE SIGNS

1 Object sensing apparatus (first example embodiment)
2 Object sensing apparatus (second example embodiment)
10 Transmitter
11 Emission unit
20 Receiver
21 Reception unit
22 IF signal generation unit
23 One-dimensional spectrum generation unit 23
24 Position detection unit
25 Displacement detection unit
26 Two-dimensional spectrum generation unit
110 Computer
111 CPU
112 Main memory
113 Storage apparatus
114 Interface
115 Display controller
116 Data reader/writer
117 Bus
118 Display apparatus
119 Recording medium

The invention claimed is:
1. An object sensing apparatus comprising:
a transmitter configured to emit an RF transmission signal subjected to periodic frequency sweeping, in each of a plurality of periods;
a receiver configured to receive a reflected wave of the RF transmission signal reflected by an object as an RF reception signal,
wherein the receiver comprises an IF signal generation circuit configured to generate an IF signal in each period by mixing the RF transmission signal and the RF reception signal;
a processor; and
a memory storing program code executable by the processor to:
generate a one-dimensional spectrum with respect to distance obtained using the object sensing apparatus as a reference, based on the IF signal of each period, and use the generated one-dimensional spectrum to generate a one-dimensional spectrum with fixed object reflection removed, from which a signal component that is included in the IF signal and is caused by a reflected wave from a fixed object present in an emission range has been removed;
detect a position of an object other than the fixed object based on an amplitude of the one-dimensional spectrum with the fixed object reflection removed; and detect displacement of the object other than the fixed object, based on a phase of the one-dimensional spectrum with the fixed object reflection removed, which corresponds to the detected position of the object other than the fixed object:

wherein for each of a plurality of distance bins, the processor estimates a center of a circular arc obtained by plotting a one-dimensional spectrum for the distance bin on a complex plane, corrects a position of the circular arc based on the estimated center, and uses the corrected circular arc obtained for each distance bin to generate the one-dimensional spectrum with the fixed object reflection removed.

2. The object sensing apparatus according to claim 1, wherein the processor selects a specific distance bin of the one-dimensional spectrum based on the amplitude of the one-dimensional spectrum with the fixed object reflection removed, and for the selected distance bin, estimates the center of the circular arc obtained by plotting the one-dimensional spectrum for the specific distance bin on the complex plane, corrects the position of the circular arc based on the estimated center, and uses the corrected circular arc for the specific distance bin to generate the one-dimensional spectrum with the fixed object reflection removed.

3. The object sensing apparatus according to claim 1, wherein the processor generates a two-dimensional spectrum based on the IF signal of each period, selects a specific distance bin of the one-dimensional spectrum based on an amplitude of the generated two-dimensional spectrum, and for the specific distance bin, estimates the center of the circular arc obtained by plotting the one-dimensional spectrum for the distance bin on the complex plane, corrects the position of the circular arc based on the estimated center, and uses the corrected circular arc for the specific distance bin to generate the one-dimensional spectrum with the fixed object reflection removed.

4. The object sensing apparatus according to claim 1, wherein the program code is executable by the processor to further:

generate a two-dimensional spectrum of the IF signal by applying a one-dimensional Fourier transform to the one-dimensional spectrum with the fixed object reflection removed, wherein the processor detects the position of the object other than the fixed object based on a position of a peak of the amplitude of the two-dimensional spectrum generated based on the one-dimensional spectrum with the fixed object reflection removed.

5. The object sensing apparatus according to claim 4, wherein the processor detects the displacement of the object other than the fixed object based on the phase of the one-dimensional spectrum with the fixed object reflection removed, which corresponds to the position of the object other than the fixed object detected based on the two-dimensional spectrum.

6. An object sensing method comprising:

emitting an RF transmission signal subjected to periodic frequency sweeping, in each of a plurality of periods;

receiving a reflected wave of the RF transmission signal reflected by an object as an RF reception signal;

generating an IF signal in each period by mixing the RF transmission signal and the RF reception signal;

generating a one-dimensional spectrum with respect to distance obtained using an emitting position of the RF transmission signal or a receiving position of the RF reception signal as a reference, based on the IF signal of each period, and using the generated one-dimensional spectrum to generate a one-dimensional spectrum with fixed object reflection removed, from which a signal component that is included in the IF signal and is caused by a reflected wave from a fixed object present in an emission range has been removed;

detecting a position of an object other than the fixed object based on an amplitude of the one-dimensional spectrum with the fixed object reflection removed; and detecting displacement of the object other than the fixed object, based on a phase of the one-dimensional spectrum with the fixed object reflection removed, which corresponds to the detected position of the object other than the fixed object:

wherein in generating the one-dimensional spectrum, for each of a plurality of distance bins, a center of a circular arc obtained by plotting a one-dimensional spectrum for the distance bin on a complex plane is estimated, a position of the circular arc is corrected based on the estimated center, and the corrected circular arc obtained for each distance bin is used to generate the one-dimensional spectrum with the fixed object reflection removed.

7. The object sensing method according to claim 6, wherein when the one-dimensional spectrum is generated, a specific distance bin of the one-dimensional spectrum is selected based on the amplitude of the one-dimensional spectrum with the fixed object reflection removed, and for the selected distance bin, the center of the circular arc obtained by plotting the one-dimensional spectrum for the specific distance bin on the complex plane is estimated, the position of the circular arc is corrected based on the estimated center, and the corrected circular arc of the specific distance bin is used to generate the one-dimensional spectrum with the fixed object reflection removed.

8. The object sensing method according to claim 6, wherein when the one-dimensional spectrum is generated, a two-dimensional spectrum is generated based on the IF signal of each period, selects a specific distance bin of the one-dimensional spectrum based on an amplitude of the generated two-dimensional spectrum, and for the specific distance bin, estimates the center of the circular arc obtained by plotting the one-dimensional spectrum for the distance bin on the complex plane, corrects the position of the circular arc based on the estimated center, and uses the corrected circular arc for the specific distance bin to generate the one-dimensional spectrum with the fixed object reflection removed.

9. The object sensing method according to claim 6, further comprising generating a two-dimensional spectrum of the IF signal by applying a one-dimensional Fourier transform to the one-dimensional spectrum with the fixed object reflection removed, wherein when the position is detected, the position of the object other than the fixed object is detected based on a position of a peak of the amplitude of the two-dimensional spectrum generated based on the one-dimensional spectrum with the fixed object reflection removed.

10. The object sensing method according to claim 9, wherein
when the displacement is detected, the displacement of the object other than the fixed object is detected based on the phase of the one-dimensional spectrum with the fixed object reflection removed, which corresponds to the position of the object other than the fixed object detected based on the two-dimensional spectrum.

11. A non-transitory computer readable recording medium in an object sensing apparatus that causes the object sensing apparatus to emit an RF transmission signal subjected to periodic frequency sweeping, in each of a plurality of periods; receive a reflected wave of the RF transmission signal reflected by an object as an RF reception signal; generate an IF signal in each period by mixing the RF transmission signal and the RF reception signal; and a processor, the non-transitory computer readable recording medium including a program recorded thereon, the program including instructions that cause the processor to carry out:
generating a one-dimensional spectrum with respect to distance obtained using the object sensing apparatus as a reference, based on the IF signal of each period, and using the generated one-dimensional spectrum to generate a one-dimensional spectrum with fixed object reflection removed, from which a signal component that is included in the IF signal and is caused by a reflected wave from a fixed object present in an emission range has been removed;
detecting a position of an object other than the fixed object based on an amplitude of the one-dimensional spectrum with fixed object reflection removed; and
detecting displacement of the object other than the fixed object, based on a phase of the one-dimensional spectrum with fixed object reflection removed, which corresponds to the detected position of the object other than the fixed object:
wherein in generating the one-dimensional spectrum, for each of a plurality of distance bins, a center of a circular arc obtained by plotting a one-dimensional spectrum for the distance bin on a complex plane is estimated, a position of the circular arc is corrected based on the estimated center, and the corrected circular arc obtained for each distance bin is used to generate the one-dimensional spectrum with the fixed object reflection removed.

12. The non-transitory computer readable recording medium according to claim 11, wherein
when the one-dimensional spectrum is generated, a specific distance bin of the one-dimensional spectrum is selected based on the amplitude of the one-dimensional spectrum with the fixed object reflection removed, and for the selected distance bin, the center of the circular arc obtained by plotting the one-dimensional spectrum for the specific distance bin on the complex plane is estimated, the position of the circular arc is corrected based on the estimated center, and the corrected circular arc of the specific distance bin is used to generate the one-dimensional spectrum with the fixed object reflection removed.

13. The non-transitory computer readable recording medium according to claim 11, wherein
wherein the one-dimensional spectrum is generated, a two-dimensional spectrum is generated based on the IF signal of each period, selects a specific distance bin of the one-dimensional spectrum based on an amplitude of the generated two-dimensional spectrum, and for the specific distance bin, estimates the center of the circular arc obtained by plotting the one-dimensional spectrum for the distance bin on the complex plane, corrects the position of the circular arc based on the estimated center, and uses the corrected circular arc for the specific distance bin to generate the one-dimensional spectrum with the fixed object reflection removed.

14. The non-transitory computer readable recording medium according to claim 11, further comprising
generating a two-dimensional spectrum of the IF signal by applying a one-dimensional Fourier transform to the one-dimensional spectrum with the fixed object reflection removed,
wherein when the position is detected, the position of the object other than the fixed object is detected based on a position of a peak of the amplitude of the two-dimensional spectrum generated based on the one-dimensional spectrum with the fixed object reflection removed.

15. The non-transitory computer readable recording medium according to claim 14, wherein
when the displacement is detected, the displacement of the object other than the fixed object is detected based on the phase of the one-dimensional spectrum with fixed object reflection removed, which corresponds to the position of the object other than the fixed object detected based on the two-dimensional spectrum.

* * * * *